US007865722B2

(12) United States Patent
Moran et al.

(10) Patent No.: US 7,865,722 B2
(45) Date of Patent: Jan. 4, 2011

(54) METHOD OF IDENTIFYING AN OBJECT AND A TAG CARRYING IDENTIFICATION INFORMATION

(75) Inventors: Peter Malcolm Moran, Singapore (SG); Adrian Paul Burden, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 881 days.

(21) Appl. No.: 10/625,235

(22) Filed: Jul. 22, 2003

(65) Prior Publication Data

US 2005/0017082 A1 Jan. 27, 2005

(51) Int. Cl.
*H04L 29/06* (2006.01)
(52) U.S. Cl. ...................................... 713/161
(58) Field of Classification Search ................. 427/548; 713/161
See application file for complete search history.

(56) References Cited

U.S. PATENT DOCUMENTS

| | | | | |
|---|---|---|---|---|
| 3,601,913 A * | 8/1971 | Pollock | ....................... | 283/82 |
| 3,651,312 A | 3/1972 | Barney | | |
| 3,940,795 A * | 2/1976 | Lemelson | .................... | 360/101 |
| 4,264,648 A * | 4/1981 | Ziolo et al. | .................. | 427/128 |
| 4,985,614 A | 1/1991 | Pease et al. | .................. | 235/437 |
| 5,035,960 A | 7/1991 | Kamigaki et al. | ............ | 428/694 |
| 5,139,884 A | 8/1992 | Daimon et al. | .............. | 428/402 |
| 5,204,663 A * | 4/1993 | Lee | ........................... | 340/5.28 |
| 5,235,166 A | 8/1993 | Fernadez | .................... | 235/449 |
| 5,546,462 A | 8/1996 | Indeck et al. | ................. | 380/23 |
| 5,734,020 A * | 3/1998 | Wong | ......................... | 530/350 |
| 5,920,628 A | 7/1999 | Indeck et al. | ................. | 380/23 |
| 5,972,438 A * | 10/1999 | Suzuki et al. | ............... | 427/548 |
| 6,328,209 B1 | 12/2001 | O'Boyle | ...................... | 235/380 |
| 6,602,620 B1 * | 8/2003 | Kikitsu et al. | ............ | 428/842.2 |
| 6,959,384 B1 * | 10/2005 | Serret-Avila | ................ | 713/176 |
| 7,018,838 B2 * | 3/2006 | Murphy et al. | .............. | 435/325 |
| 7,548,619 B2 * | 6/2009 | Chaney | ...................... | 380/201 |
| 2002/0034662 A1 * | 3/2002 | Den | .......................... | 428/692 |
| 2002/0199100 A1 * | 12/2002 | Nenashev | .................... | 713/161 |
| 2005/0125659 A1 * | 6/2005 | Sarfati et al. | ................ | 713/161 |

FOREIGN PATENT DOCUMENTS

GB 1216403 2/2009
WO WO 01/025002 A1 4/2001

OTHER PUBLICATIONS

Bernhardt, A.F., et al., "Arrays of field emission cathode structures with sub-300 nm gates," *J. Vac. Sci. Technol. B*, 18(3) pp. 1212-1215, May/Jun. 2000.

(Continued)

*Primary Examiner*—Farid Homayounmehr
(74) *Attorney, Agent, or Firm*—Michael A. Whittaker; Biotechnology Law Group

(57) ABSTRACT

A method of identifying an object having identification information, said identification information being used to verify the object's identity, said method comprising: determining at least one characteristic of a magnetic field of at least a portion of a tag, thereby obtaining a first specific magnetic signal, wherein the tag comprises a substantially non-magnetic host material having pores, wherein at least some of the pores contain a magnetic material, and
storing signal information relating to said first specific magnetic signal, said stored signal information forming the identification information of the object.

23 Claims, 12 Drawing Sheets

OTHER PUBLICATIONS

Cheetham, Antony K., et al., "Open-Framework Inorganic Materials," *Angewandte Chemie-International Edition*, 38, pp. 3269-3292, 1999.

Föll, Helmut, et al., "Pores in III-V Semiconductors," *Advanced Materials*, 15, No. 3, pp. 183-198, 2003.

Li, A.P., et al., "Hexagonal pore arrays with a 50-420 nm interpore distance formed by self-organization in anodic alumina," *Journal of Applied Physics*, vol. 84, No. 11, pp. 6023-6026, Dec. 1, 1998.

Li, An-Ping, et al., "Fabrication and Microstructuring of Hexagonally Ordered Two-Dimensional Nanopore Arrays in Anodic Alumina," *Advanced Materials*, vol. 11, No. 6, pp. 483-487, 1999.

Nielsch, K., et al., "High density hexagonal nickel nanowire array," *Journal of Magnetism and Magnetic Materials*, 249, pp. 234-240, 2002.

Rao, C.N., et al., "Inorganic nanotubes," *Dalton Transactions*, 1, pp. 1-24, 2003.

Sellmyer, D.J., et al., "Magnetism of Fe, Co and Ni nanowires in self-assembled arrays," *Journal of Physics: Condensed Matter*, 13, R433-R460, 2001.

Subhadra, K.G., et al., "Systematic hardness studies on lithium niobate crystals," *Bull. Mater. Sci.*, vol. 23, No. 2, pp. 147-150, Apr. 2000.

Varghese, Oomman K., et al., "Highly ordered nanoporous alumina films: Effect of pore size and uniformity on sensing performance," *Journal of Materials Research*, vol. 17, No. 5, pp. 1162-1171, May 2002.

* cited by examiner

METHOD OF IDENTIFYING AN OBJECT AND A TAG CARRYING IDENTIFICATION INFORMATION

This invention relates to a method of identifying an object having identification information, said identification information being used to verify the object's identity. The invention also relates to a tag carrying identification information, wherein this identification information is used to verify an object's identity. The invention further relates to an object carrying such a tag. In addition, the invention relates to a method of producing a system for object identification and to a system for object identification.

Identification technology has been an area of widespread interest and development for many years. Common methods of identification rely on the use of readable tags. Such tags range from barcodes and machine-readable tags on the visible scale, to radioactive isotopes and micron-sized plastic tags at microscopic scales.

One of the main reasons for the continued interest in identification technology is the incidence of fraud largely attributable to transactions which have been carried out in a non-secure manner. The need for more secure systems of transactions is apparent. For example, there is a need to reliably authenticate personal documents such as passports and driver's licenses as well as commercial instruments such as ATM cards, credit cards, currency, cheques and other instruments of commercial transactions at the point of transaction. In another example, it would be extremely beneficial to the software and entertainment industries to be able to uniquely fingerprint items such as compact discs (CDs) and digital versatile disks (DVDs) to prevent the use of pirate copies. In yet another example, where articles of great commercial value, such as precious stones, artwork, and antiques, are transacted, it is vital that the party receiving such articles is able to ascertain the identity of the articles before issuing credit. At a more common level, there is also a need for a cheap and reliable authentication system for any physical object that needs to have its identity verified subsequently.

Several methods of identification are known and are described in the following.

A well-known identification method relies on information encoded in a magnetic stripe, also known as a magnetic barcode. A magnetic stripe is typically made up of small magnetic particles set in a resin. The particles are either applied directly to the card or made into a stripe on a plastic backing which is applied to the card. The stripe is encoded by having regions of these particles (e.g. iron particles) magnetized in a direction, i.e. polarity of the magnetic particles in the stripe is changed locally, to define bits of information. By changing the direction of the encoding along the length of the stripe, information is written and stored on the stripe. Thus, identification information such as a user account number is first programmed into the magnetic stripe by a write head, and subsequently verified by reading the magnetic stripe with a read head and then having the user sign a document or chit to verify the user's identity.

Such systems are inherently non-secure because the signature and data encoded in the magnetic stripe can be forged easily. Furthermore, the magnetic media is prone to corruption when the magnetic stripe is brought into close proximity with magnetic fields.

Several methods have been suggested for creating a secure encoding on a magnetic stripe, tradenames for these methods include: Watermark Magnetics, XSec, Holomagnetics, XiShield, ValuGuard, and MagnaPrint, for example.

The Watermark Magnetics encoding method relies on changes in particle orientation and the detection of transitions between adjacent blocks of different orientation.

U.S. Pat. No. 5,235,166 discloses a method relying on the relative position of specific magnetic signals. More particularly, the deviation in the precise locations of local peak points in the signal waveform is referred to as "jitter" and is utilized as a magnetic security fingerprint.

The American Bank Note Holomagnetics system described in U.S. Pat. No. 6,328,209 uses a series of machine-readable holographic images over the magnetic stripe for verification purposes.

The ValuGuard system (U.S. Pat. No. 4,985,614) utilizes inherent randomly varying and detectable characteristics of a recordable magnetic region.

According to U.S. Pat. Nos. 5,546,462 and 5,920,628, issued to Indeck et al. the microscopic structure of magnetic medium is a permanent random arrangement of microfeatures, and therefore, remanent noise characteristics of any magnetic medium is unique and deterministic. To serve as a security feature, a region of magnetic medium is saturated in one direction by a large applied magnetic field, and the resulting remanent magnetization or noise obtained is stored as the identification information which is subsequently verified during transaction. The method of identification disclosed in U.S. Pat. Nos. 5,546,462 and 5,920,628 relies on small fluctuations within the overall magnetic signal from the magnetic medium that correlates to grain boundary and orientation information unique to the magnetic medium. If the magnetic polarization, grain boundaries or orientation changes, these fluctuations will change. The magnetic signal of the magnetic medium will consequently change, resulting in the loss of the identification information. In addition, the method has the disadvantage of being difficult to correlate accurately. Furthermore, magnetic history of the stripe is relied upon to produce the remanent noise used in object identification. Therefore, if the magnetic medium were re-magnetized under the influence of another magnetic field, the unique signal would be altered.

WO 01/025002 A1 discloses colloidal rod (nano)particles and their use as nanobar codes. These nanoparticles are usually cylindrically shaped and can comprise different metals such as gold, silver, platinum and nickel. A two-step process is used to produce these nanoparticles. In a first step, a metal is electrochemically reduced into cylindrical pores of a template. In a second step, the template is dissolved to yield free-standing, isolated rod nanoparticles. Based on such a procedure, barcode-like nanoparticles having segments made up of different metals were produced. Differential reflectivity between adjacent metal segments is used to distinguish between different nanoparticles or barcodes. This is done by means of an optical microscope.

There remains the need for cheap and reliable alternatives in identity authentication systems. Consequently, it is a goal of the present invention to develop new methods and devices for marking and identifying individual objects. It is also a goal of this invention to provide an inexpensive tagging system that is impossible or prohibitively difficult and expensive to forge.

These goals are solved, for example, by the methods, the tag and the system having the features of the respective independent claims.

One of these methods is a method of identifying an object having identification information, said identification information being used to verify the identity of the object. This method comprises determining at least one characteristic of a magnetic field of (produced by) at least a portion of a tag, thereby obtaining a first specific magnetic signal, wherein the tag comprises a substantially non-magnetic host material having pores, wherein at least some of the pores contain a magnetic material, and storing signal information relating to said first specific magnetic signal, said stored signal information forming the identification information of the object.

Another method of the invention is a method of identifying an object having identification information, said identification information being used to verify the identity of the object, said method comprising:

determining at least one characteristic of an electric or electromagnetic field of (produced by) at least a portion of a tag, thereby obtaining a first specific electric or electromagnetic signal, wherein the tag comprises a substantially insulating host material having pores, wherein at least some of the pores contain a substantially conducting material and wherein at least some of the substantially electrically conducting material in the pores is connected or coupled to a voltage source, and storing signal information relating to said first specific electric or electromagnetic signal, said stored signal information signal forming the identification information of the object.

Another method of the invention is a method of producing a system for object identification. This method comprises:

determining at least one characteristic of a magnetic field of at least one portion of a tag, thereby obtaining a first specific magnetic signal, wherein the tag comprises a substantially non-magnetic host material having pores, and wherein at least some of the pores contain a magnetic material, storing signal information relating to said first specific magnetic signal, said stored signal information forming the identification information of an object to be identified.

Yet another method of the invention is a method of producing a system for object identification comprising:

determining at least one characteristic of an electric or electromagnetic field of at least a portion of a tag, thereby obtaining a first specific electric or electromagnetic signal, wherein the tag comprises a substantially electrically insulating host material having pores, wherein at least some of the pores contain a substantially electrically conducting material and wherein at least some of the substantially electrically conducting material is connected to a voltage source, and storing signal information relating to said first specific electric or electromagnetic signal, said stored signal information forming the identification information of an object to be identified.

The invention is also directed to a tag carrying identification information, said identification information being used to verify an object's identity, said tag comprising a substantially non-magnetic host material having pores, wherein at least some of the pores contain a magnetic material, and at least one coating layer covering at least partially a surface of the non-magnetic host material.

The invention is further directed to a tag carrying identification information, said identification information being used to verify an object's identity, said tag comprising a substantially electrically insulating host material having pores, wherein at least some of the pores contain a substantially electrically conducting material, and at least one coating layer covering at least partially a surface of the host material.

In addition, the invention is also directed to an object having a tag carrying identification information, said identification information being used to verify the object's identity, wherein the tag comprises a substantially non-magnetic host material having pores, wherein at least some of the pores contain a magnetic material, and at least one coating layer covering at least partially a surface of the non-magnetic host material.

The invention is further directed to an object having a tag carrying identification information, said identification information being used to verify the object's identity, said tag comprising a substantially electrically insulating host material having pores, wherein at least some of the pores contain a substantially electrically conducting material, and at least one coating layer covering at least partially a surface of the host material.

The invention is also directed to a system for object identification. This system comprises a tag carrying identification information, said identification information being used to verify an object's identity, wherein the tag comprises a substantially non-magnetic host material having pores, wherein at least some of the pores contain a magnetic material. This system also comprises a reading system for measuring at least one magnetic characteristic of the tag. The reading system may further include a writing system for magnetizing the tag before reading. The system further comprises a data storage medium for storing data corresponding to a magnetic signal obtained from at least a portion of the tag. Such a system can also be used in conjunction with a tag that is based on a substantially electrically insulating host material, wherein the tag comprises substantially electrically insulating host material having pores, wherein at least some of the pores contain a substantially electrically conducting material, wherein at least some of the said substantially electrically conducting material is connected to a voltage source. The reading system, writing system, and data storage medium can also be part of such a system.

The invention is based on the finding that disorder which exists (inherently) or is deliberately created in porous composite materials can be used for identity verification purposes. Such a purpose can be realized by incorporating magnetic materials into the pores of porous materials. Individual tags made from such a material each have unique magnetic characteristics. Suitable composite materials are known and are described, for example, in U.S. Pat. Nos. 5,139,884, 5,035,960, Nielsch et al. Journal of Magnetism and Magnetic Materials 249 (2002) 234-240, or Sellmyer et al., Journal of Physics: Condensed Matter 13, (2001), R433-R430). Furthermore, if materials capable of producing an electric or electromagnetic field are used in the pores, the voltage source connected to the material in the pores can be adjusted to enhance or produce the unique characteristic signal from the tag.

The use of such porous materials or any other suitable porous material, such as zeolites and Group III-V materials which are also disclosed herein, has several advantages.

Firstly, it is quick and cheap to develop these tags, each of which provides a unique fingerprint. Secondly, such tags can be small (100 µm×100 µm or less) and be made essentially transparent to the naked eye. Thirdly, such tags are nearly impossible to forge. Fourth, the fingerprint of such tags is highly damage tolerant as only a portion of the original fingerprint may be sufficient for verification. Fifth, such a technology is scaleable, having interpore distances of tens of nanometers to the micrometer range. Yet another advantage is that current magnetic media data storage technology, such as data storage tapes and hard disk technology, can be readily adopted to read the fingerprints. Still another advantage a porous composite material as described in the present invention has in its use for authentication purposes is that it can, in certain cases, provide for strong out of plane magnetization by having deep, high aspect ratio pores perpendicular to the surface of the tag. This has the twofold advantage of firstly, improving the ease of reading the magnetic signal of the tags and secondly, making the tags more difficult to forge. Yet another important advantage of the invention is that it does not necessarily rely on stored magnetic information. Instead, in one embodiment of the invention, the identification relies on the fluctuation of the magnetic signal that is dependent on physical disorder between individual magnetic elements within the tag. As the disorder is not affected by magnetic fields, corruption of the magnetic signal of the tag due to unintended magnetic fields is avoided. Thus, identification information stored in such a manner is more stable than magnetically stored information based on conventional magnetic barcode technology as described above.

In general, any porous host material that is at least substantially non-magnetic (magnetically inert) or substantially electrically insulating can be used in the present invention. Usually, this host material has good mechanical, thermal and chemical stability in order that migration of the material in the pores to other regions of the host material is prevented or negligible. In addition, the host material's stability minimizes oxidation and unwanted chemical modification of the material in the pores. Such properties enable the magnetic, electric or electromagnetic signal obtained from the tag to remain uniquely identifiable. A suitable host material can, for example, comprise porous alumite prepared by the anodisation of aluminium films as described in U.S. Pat. Nos. 5,139,884, 5,035,960 or Nielsch et al. supra. Thus, the host material of the tag can be alumina.

Other suitable host materials include porous polymeric films (usually bi- or tri-block copolymers where one component has been selectively removed) or porous semi-conducting materials such as porous silicon or porous III-V materials (see, for example, Föll et al., Advanced Materials, 15, 183-198 (2003)). Examples of III-V materials suitable for use as a porous host material in the present invention include GaAs, InP and AlAs. Another suitable host material is zeolites. Examples of suitable zeolites include any one of the members of the zeolite mineral group, for instance clinoptilolite, chabazite, phillipsite and mordenite. Other suitable porous materials include inorganic oxides such silicon oxide, zinc oxide and tin oxide.

If the method of identifying an object is based on the determination of at least one electric or electromagnetic characteristic, examples of suitable host materials are electrically insulating materials such as alumina, porous silica, other oxides, polymeric films and zeolites.

It is also possible in the invention that the host material comprises hollow tubes, for example, carbon nanotubes. The tubes may preferably be cast within a second host material.

As can be seen from above, the way of obtaining the porous host material depends on the chosen materials. The preparation of zeolites is well known to a person skilled in the art (see for example, Cheetham et al., Angewandte Chemie-International Edition 38, 3269-3292 (1999) and references therein). Porous semi-conducting host materials can be obtained as described in Föll et al. as referenced above. A variety of pore forming processes are available for creating pores in the host materials such as alumina, e.g. anodisation using different acids.

Pore diameters are tuneable based on the anodisation process used to create the host material if such a process is used to create the pores of the host material. Respective anodisation conditions for achieving different pore sizes are known to the skilled person. Firstly, the anodisation process can take place in acidic conditions. Examples of acids which can be used include sulfuric acid, oxalic acid, chromic acid and phosphoric acid, with acid concentrations typically ranging from 0.1M to 0.5M. Second, the applied voltages depend on the desired pore size and may range from 15V for small pores to 200V for large pores. In order to obtain pores with diameters ranging from 10-50 nm, 0.2M sulphuric acid can be used and 15-25V is applied. To get pores of 30-100 nm, 0.3M oxalic acid can be used and a potential of 30-80V is applied. To get large pores of 100-500 nm, 0.3 M phosphoric acid can be used with a potential of 120-200V. By varying anodisation conditions (e.g. applied voltage; cf. Varghese et al., J. Mat. Res. Vol. 17 No. 5, May 2002) and the thickness, purity and composition of the film used, metal oxide host materials having surprisingly disordered pores are obtainable.

The ability to use a wide range of pore sizes from about 10 nm to the micrometer range, as well as interpore distances of tens of nanometers to the micrometer range (for example from 20 nm to 500 nm), provides flexibility in the daily use of the invention. Methods of fabricating and micro-structuring pores are known, see for example Li et al., Journal of Applied Physics, 84, (1998), 6023-6026. For instance, different pore sizes could be used for different applications. Where long-term security is vital and the fingerprint need not be read often (e.g. jewellery and legal documents), tags having smaller pores and small interpore distance (e.g. around 50 nm) can be used to increase the security of the identification information. Where reading of the tag is done on a daily basis, e.g. credit or ATM cards, larger pores at larger interpore distances (e.g. around 500 nm) could be used. Furthermore, small and large pores can also be used in combination on a single object. For example, large groups of pores can be used in a credit card for verifying regular transactions. However, when the authenticity of the card needs to be verified or an expensive purchase is to be made, the identification information stored in the tag having smaller pores can be utilized. In preferred embodiments, tags are used wherein the pores of the host material have a diameter between about 10 nm to about 500 nm.

Any material exhibiting magnetic properties can be used to fill the host material's pores, including but not limited to magnetic materials such as ferrimagnetic materials, antiferromagnetic materials and preferably ferromagnetic materials. Magnetic materials used to fill the pores in the host material include but are not limited to ferromagnetic materials such as Fe, Ni, Co, Gd, Dy, the corresponding alloys, oxides and mixtures thereof, and other compounds such as MnBi, CrTe, EuO, $CrO_2$ and MnAs. Other materials influenced by magnetism are also contemplated. Examples of such materials include ferrimagnetic materials e.g. spinels, garnets and ferrites such as magnetite. Other materials commonly used in magnetic media, such as alloys of Ce, Cr, Pt, Nd, B, Sm, and alloys such as $SmCo_5$, AlNiCo, Permalloy and MuMetal are also contemplated.

Although reference is primarily made in the following to tags using magnetic materials to illustrate the invention, it is nevertheless possible to use in the tags, methods and systems described herein a conducting material which produces an electric or electromagnetic field. For example, electrically conducting materials such as metals (e.g. Cu, Sn, Fe, Ni) or semi-conducting materials can be used in the pores of the substantially electrically insulating host material. When coupled to a fluctuating AC voltage, an electrical charge oscillates in the conducting material in the pores, thereby generating an electromagnetic field. The electrical connection is usually provided by a conducting layer or region located under the porous host material such that it makes electrical contact to at least some of the electrically conductive material located in the pores.

Magnetic materials as well as electrically conductive materials can be deposited into the pores of the host material in any suitable way. Commonly known methods are vapour deposition techniques, melt casting, solution casting and electrochemical deposition techniques such as electrodeposition, pulsed electrodeposition, or electroless plating.

In one embodiment, the method of identifying an object comprises storing recorded information on the tag. This storing (recording) of information can be done by magnetizing the magnetic material that is present in a group of pores into poled domains, or by determining through patterning groups of pores of the tag to contain magnetic (or electrically conducting) material or by a combination of these two approaches. This recording step is preferably done prior to the first determination of the at least one characteristic of the magnetic, electromagnetic, or electric field or alternatively after this first determination.

In applications such as those described in the present invention where objects or persons need to undergo verification or authentication procedures, it may be desirable to include certain (individualized) information onto the card or tag that is being read during the authentication process. Such (individualized) information referred to here can relate to any desired subject matter, and may relate to the identity of the object or the owner of the object, for instance personal particulars (such as a person's name, residential address, nationality, date of birth etc.), identification numbers, bank account numbers, location of the tagging information, particulars relating to the tagging information, or any other information. In the context of this invention, such information or any other information that is stored on the tag in addition to the tagging information is termed recordable or recorded information. Accordingly, tags of the present invention can store not only tagging (identification) information, but also recordable information and thus can serve also as data storage medium similar to conventional magnetic storage media.

The storing/recording of this information is achievable in several ways. For example, a strip of porous host material filled with magnetic material can be magnetised in such a way that groups of magnets in many pores (otherwise also known as magnetic domains) are magnetized or poled into specific directions by conventional magnetic write heads to record the recordable information. Subsequently, any suitable read head (e.g. those used in card readers or in the hard disk industry) can be used to read the strip when it is desired to obtain the recorded information. The recorded information obtained this way is usually a digital signal which can then be processed into human-readable information. In order to obtain a tagging signal from the same strip, a small region of the strip can be designated to be the tagging (identification) region. This region storing the tagging information can be read by a read-head to determine, for example, an analogue signal representing the unique characteristic of the magnetic field within this region of the strip. In this way, as mentioned above, the tag of the present invention can be used to store not only identification information, but is also used as a data storage medium to store bits of information in a fashion similar to a conventional credit card magnetic strip or magnetic barcode. The advantages of this approach include the possibility of reading the large zones of magnetic domains in any existing conventional way. Furthermore, this approach can also afford some resilience to overwriting due to the anisotropy of the many pores comprising each bit.

An alternative approach to storing both tagging and recordable information onto a tag other than by magnetising is to fill distinct groups of pores in a strip of host material with magnetic or electrically conducting/semi-conducting material according to a predetermined pattern (layout) (cf. FIG. 6B). The pattern of the filled zones is determined according to a desired bar code pattern or bit storage pattern which in turn corresponds to the recordable information as mentioned above. This pattern alone provides for a fixed label, and has the advantage of not requiring, in the case of the magnetic material in the host, poled directions. When it is desired to obtain the recorded information, conventional magnetic swipe card readers can be used for instance, because the recorded information is usually on a suitably large length scale. It is also possible to read the strip using, for example, a finer resolution reader to obtain the tagging signal on the strip.

The advantage of this approach is that it does not require magnetic material in the tag to be magnetised with poled domains, and is therefore not susceptible to damage from unintended magnetic fields. Therefore, if it is necessary to magnetise or remagnetise the strip to enhance the reading of the tagging or recordable information, the information (tagging and recordable) on such a strip will not be corrupted by the external magnetic field.

In the above two embodiments, both recorded information and tagging information are comprised in the same strip. However, the tag region does not have to reside in the same strip storing the recorded information. It is also possible to have a separate tag carrying the tagging information located at any other position on the object independently of the magnetic strip (e.g. adjacent to the strip, or on the opposite side of the object). It is also possible that combinations of the above embodiments are used, for example, to further increase the level of security.

The tag may further comprise at least one coating layer. The coating layer usually performs the function of protecting the tag (mechanically and/or chemically, e.g. from oxidation) and/or disguising the tag and/or facilitating the reading of the tag. The coating layer can comprise a single layer or, two layers, or if desired, multiple layers. The coating layer usually comprises at least a layer of hard material such as a rigid polymer, sol-gel derived oxide, diamond-like carbon, tetrahedral amorphous carbon or spun-coated lacquer. Here we define a "hard" material as a material preferably having a bulk yield stress of 50 mega-newtons per square meter, i.e. 50 $MN/m^2$, or more. An example of a suitable polymer that acts as the hard material is poly methyl methacrylate which has the advantages of being tough and transparent. A single coating layer of poly methyl methacrylate can be produced by dip or spin coating the tag with a solution of monomeric methyl methacrylate (thereby also filling parts in the pores that are not filled with magnetic material). The monomer solution is polymerized during or after coating.

The layer of hard material can be further coated with one or more layers of soft material. By soft, we mean that the layer has a bulk yield stress less than the bulk yield stress of the chosen underlying hard coating layer. Preferably the soft coating material has a bulk yield stress of less than 50 $MN/m^2$. Contemplated soft-coating materials include polypropylene, polystyrene, polyimide, polytetrafluoroethylene (PTFE, also known as Teflon), polyvinyl acetate, polyvinylidene fluoride (PVDF), polyacrylic acid and other chemically and thermally stable polymers. These materials may be deposited, for example, from solution by dip coating, spin coating, screen-printing, table coating or brushing, and then drying. They may also be deposited by melt casting.

For applications not subjected to high levels of wear and tear, a thin coating can be used. This will not prevent the signal from being read. If a thick coating is preferred to increase the longevity of a tag, such a coating can be made of a material that is easily removable before reading, should this be necessary for reading the tag. Surface treatment of the coating is also sometimes desirable to improve the tribology of the upper layer that will be in contact with the read head. Examples include plasma treatments of the surface to provide low friction surface groups like fluoride, oxide, nitride, etc.

Prior to the application of a coating layer on the tag (e.g. after at least some of the pores of the tag have been filled with magnetic material), the surface of the tag may be polished or planarised. This would further improve the reading of the tag. Conventional polishing or planarization methods can be used for this purpose, including lapping and chemical mechanical polishing.

Generally, tags that are used in the present invention can be produced in-situ, i.e. without a separate substrate, by depositing the host or host precursor material directly onto the object to be tagged via commonly known deposition methods, such as vapour deposition methods and electro-deposition. Deposition methods are particularly suited for labelling small objects such as precious gems. Examples include, but are not limited to, physical sputtering, thermal evaporation, plasma enhanced chemical vapour deposition, electron beam evaporation, and pulsed laser deposition.

However, if necessary, tags can also comprise a supporting substrate. The presence of a substrate facilitates the tag to be held securely in place while adhesive material can be applied to the bottom of the substrate so that the tag is easily affixed to any surface without affecting the integrity of the host material and magnetic material.

Any material may be used as the substrate, depending on the object on/in which the tag is to be attached or incorporated and the environment to which object is exposed. The substrate material may be rigid, lightweight, stable and magnetically inert. A commonly used material for substrates are aluminium alloys. Other examples of suitable materials constituting the substrate include a wide range of ceramics, silicon, silica, glass, aluminium-magnesium compounds, biological materials (wood, skin, leather, bone, for example) and plastics, for example.

To further improve the performance or characteristics of the tag, the step of annealing the tag can be carried out so as to promote grain or magnetic domain growth within the magnetic material. This improves the magnetic field strength (with a single domain per pore being preferred) from the filled pores and therefore further improves the readability of the tag. Annealing temperatures should remain below the softening or melting point of the porous host and substrate, but be sufficient to promote grain growth in the material within the pores. If the temperature is raised above the Curie Temperature, it is further advantageous to cool the material back through its Curie point in the presence of a strong magnetic field. This too promotes the formation of a single domain with out-of-plane magnetism. Finally, the annealing step may be performed before or after the tag is affixed to the object. It is usual to anneal prior to affixing if the object would otherwise be damaged at the elevated temperature or the economics of the process allow many tags to be annealed as a batch prior to use. However, in the cases where the object is able to withstand the elevated temperature, the annealing step can be usefully performed with the tag on the object. Advantages for this include promoting the adhesion of the tag to the object or the fact that the tag is deposited and formed in-situ on the object.

One method of identifying an object according to the present invention requires the determination of at least one characteristic of the magnetic, electric or electromagnetic field of the tag. Several characteristics can be utilized for this purpose. Such characteristics include both scalar and vector quantities, including the magnetic or electromagnetic field strength due to a magnet in a single pore, the static capacitance of an electric field produced by electrically conducting material in a pore, the average field strength at a specific point over the tag, or alternatively, the field strength pattern (or fluctuation signal) over a portion over the tag. Such characteristics are influenced by factors such as the pore filling, the arrangement and orientation and type of magnetic material within the tag. Thus, the measured characteristic represents a unique signal in each individual tag.

In order to determine a characteristic such as the magnetic field strength pattern of a tag, any conventional read head can be used. Examples of read heads that can be used are those used in cassette tape players, video cassette recorders (VCRs), magnetic data storage tapes, hard disk drives, Zip™ discs, Jaz™ disks and magnetic stripe readers, for example. Alternatively, a magnetic force microscope, commonly known as an MFM, can be used. In addition, detection of magneto-optical effects such as the magnetic Kerr effect can be utilized. For determining characteristics such as the electric or electromagnetic field strength, any conventional high sensitivity electric field meter or EMF gaussmeter which can be calibrated to a suitable frequency can be used for this purpose.

Once the magnetic signal from the tag has been determined, it can be subjected to mathematical procedures to process (e.g. filter, smooth, take Fourier transforms or other mathematical signal processing techniques) and/or compress and/or encrypt the signal prior to storage. The first specific magnetic signal, either in the form of the raw signal obtained from the reading of the tag, or in its processed/compressed/encrypted form, can be stored in a variety of storage devices such as a hard disk, smartcard, RAM module, or any other storage media.

In a preferred embodiment of the invention, the step of determining the at least one characteristic of said magnetic field of at least a portion of the tag comprises a measurement of said characteristic of the site-specific magnetic field over a surface of said portion of the tag, thereby mapping a magnetic fluctuation signal. The magnetic signal obtained in this manner is not only a complex fluctuation signal dependent on many factors in the tag, but is at the same time specific to the location of the read site. Such a magnetic signal is advantageously used because it is usually dependent on many factors such as the orientation, strength and type of magnetic material in the tag. The complexity of such a signal makes it difficult to reverse-engineer or forge the tag.

In the method of the invention, the first magnetic signal can be obtained from scanning the entire tag or only a portion of the tag. For example, in applications which require a lower level of authentication it may be sufficient to read only a portion of the tag. This 'partial' signal then becomes the parent stored identification information. In this way, processing time for reading and recording the identification information of new tags can also be reduced.

The requirement for only a "partial" signal also makes it more complicated to forge, because the portion used is not required to be identifiable from the information on the tag alone, but preferentially forms part of an independent instruction within the overall system. This means that, in general, a counterfeiter would be forced to reproduce the entire tag, despite only some of the information being used to authenticate the object. Duplicating the unused portion would significantly increase the cost and effort needed to counterfeit the tag without significantly increasing the cost and effort for the original producer or legitimate user.

If it is desired to (further) reduce processing time, reference markings which can be detected by the read head (through magnetic, electromagnetic or electrical signals) or other sensors/devices (e.g. optical, textural, radio-active) may be built onto the tag. Identification of a reference marking or location on the tag indicating the starting position for the read head can be achieved by patterning the porous material with guide lines, e.g. a series of machine identifiable stripes, that are magnetically and/or optically detectable by the read head.

In some instances, it is desirable to pattern the porous host material with magnetic material to form stripes or other features in order to facilitate the relocation of the tag. In the context of this invention and as described above, patterning of the porous host material can refer to the filling of pores in the porous host material according to a predetermined layout which corresponds to a fixed label. The same patterning process can also be used to create reference markings for facilitating the relocation of a tag. A number of reference marking schemes can be used. For instance, where a tag is to be attached to a diamond or where a region on a magnetic stripe is designated to be the tag region, one possible way to relocate the tag is to create (for example by patterning) a non-magnetic area adjacent to the tag which will guide a read head towards the tag. This area can have any suitable shape to converge (target) at the tag. It can take on, for example, a spiral or a concentric annular shape. It may also have a triangular shape (cf. FIG. 7). It is also possible to use optical methods for locating the tag. One possibility is the use of fiducial markings which are conventionally used in the semi-conductor field. Fiducial markings can be positioned in such a way that the intersection lines indicate the location of the tag. By coupling the read head with an optical sensor, it is also possible to detect the reference markings and subsequently guide the read head to the tag.

Methods of creating reference locations can be carried out in any suitable way. For example, this can be achieved by vapour depositing a thin metal capping layer over the vacant pores, thus closing the pores (see Li et al., Advanced Materials, 11, (1999), 483-487). Conventional photolithographic and etching methods can be used to selectively open the capping layer. The capping layer serves as a mask allowing selective deposition of magnetic material in the desired regions only.

In one embodiment of the invention, storing signal information relating to the first magnetic signal comprises storing data corresponding to the at least one characteristic of the magnetic field over the surface of a portion of the tag. Such data can relate directly or indirectly to the data corresponding to the characteristic of the magnetic field measured from the tag.

Furthermore, the method of identifying an object further comprises subsequently determining the at least one characteristic of a magnetic field of the tag, thereby obtaining a second specific magnetic signal, and comparing said second specific magnetic signal (or signal information relating thereto) with the previously stored identification information. An advantage of the present method is that the second magnetic signal does not have to match the entire stored identification information. It is sufficient that there is an overlapping and thus partially matching portion between the portion read in the determination of the second signal and the portion which was scanned for obtaining the first magnetic signal and thus the stored identification information. This fact is associated with many advantages for practical applications. For example, where the tag is partially obscured by dust or dirt or has been otherwise damaged, e.g. by tearing, the magnetic signal from the remaining portion can be verified with the stored identification information.

The determination of a second magnetic signal for use in comparing with the previously stored identification information can be performed during the verification of the object's identity. Such a subsequent determination of the second magnetic signal may come from the second, third, fourth or further reading of the tag. Should the second specific magnetic signal match the stored first signal within acceptable limits, the object is authenticated, thereby ascertaining the identity of the object.

In one embodiment of the invention, the tag is attached to the object to be identified after measurement of the first specific magnetic signal. In a further embodiment, the tag is attached to the object to be identified before the measurement of the first specific magnetic signal.

As it can be seen from the above, it is possible and common on a practical level for the first and second signal determination steps to take place at different times and locations. For example, manufactured tags can be first sent to a database provider that obtains and stores the identification from the tags before delivering the tags to the tag user such as a credit card company or a diamond mining company. This tag user then affixes the tag to an object to be tagged, for example, a credit card or a diamond, before distributing it to its customers. This customer may then carry out the determination of the second magnetic signal in order to verify the identity of the object. Alternatively, the tag user may affix the tag to the object prior to reading the tag by himself or sending it to the database provider. In both cases, identification information is then obtained from the tags and stored in a database which is then used for the later identification.

In a further embodiment of the invention, the tag is magnetized prior to each determination of the magnetic signal. In this embodiment, the magnetic material within the pores of the tag can be remagnetized under a magnetic field before each reading. This increases the magnetic field signal of the tag for easy reading. For this purpose, a uniform but also an inhomogeneous magnetic field can be used to re-magnetize the tag, such as that produced by simple bar magnets, or the magnetic field generated from solenoids or combinations of magnets.

In yet another preferred embodiment, the at least one characteristic of the magnetic field of the tag is highly dependent on or is characterised by the disorder in the tag. More specifically, the disorder is related to at least one of the properties of the tag, for example, size, shape and orientation of pores, interpore distances, percentage of pore filling and crystal orientation of magnetic material in the tag. For example, the disorder can be a characteristic of the host material alone. As an example for this, a host material can be used that has different pore sizes and interpore distances, and the pores of this material can be (equally) filled with a magnetic material. It is also possible to use a host with ordered pores in which the disorder is created by varying the filling degree of the material within the pores. It is of course also possible to use a tag with a disordered structure and also vary the percentage of filled pores or (in the case of magnetic material) the crystal orientation of the material within the tag, for example. The above properties which can be manipulated to produce disorder in the tag can also be considered as degrees of freedom.

A consequence of the disorder arising from such a variety of factors is that the identity tag disclosed here requires prohibitively complex and expensive equipment to forge. In particular, forgery of the tag should require precision equipment capable of resolutions of 50 nm to 100 nm, such as a focused ion beam in a cleanroom. While with bigger pore sizes (500 nm) forgery of the tag becomes more feasible, the task of so doing is nonetheless prohibitively complex, particularly in the case where the pores are of very high aspect ratio to enhance the out-of-plane magnetization. In order to reproduce a signal from a tag, it is necessary to replicate the exact structural features such as the structure of the host material, the degree of pore filling or crystal orientation of the magnetic material (i.e. disorder) in the original tag. The precision required to manipulate materials for achieving identical disorder is not provided by any existing equipment.

In certain cases, it may be desired to enhance the disorder in a tag to obtain a unique magnetic signal. For example, some forms of carbon nanotubes (the porous host) filled with magnetic material may not inherently possess sufficient disorder. In such cases, the composite material may be redistributed or recast to achieve the desired form. In the case of carbon or other nanotubes (such as boron nitride nanotubes or molybdenum disulphide tubes, for example) containing magnetic material, the tubes could be spun cast in a polymer film or sol-gel derived film, for example, to yield disoriented nanotubes. The nanotubes are produced for example using the arc discharge method and at least partially filled with magnetic material (Rao et al., Dalton Transactions 1, 1-24 (2003)). These tubes are then dispersed in a liquid monomer or polymer solution, or a sol-gel precursor using ultrasonic agitation. This liquid is then spun onto the substrate, for example a silicon wafer or glass slide. After drying and curing the material, the desired disordered composite material is achieved. This can be further polished or planarised to form a flat smooth surface.

It is also possible to alter the levels of magnetic material within the pores of the tag. This method is usually carried out after the pores of the host material have been filled with magnetic material (for example by electrodeposition). By subjecting the tag to a further etching step to remove magnetic material in selected pores, the degree of pore filling or the distance between filled pores can be altered. FIG. 8 shows a schematic diagram of one suitable method. This method can also be used for achieving the patterning (e.g. stripes) of the magnetic material or for increasing the distance between individual magnetic material-filled pores. One advantage of this method of patterning is that stripes of magnetic material are easier to locate accurately and align than a large area containing magnetic material. A second reason is that it may be desirable to increase the average distance between magnetic material in the host material in order to make the reading process faster or easier.

As can be seen from the above virtually any object which is subject to authentication procedures can be tagged (fingerprinted) and identified by use of the present invention. Exemplary applications and articles include compact discs, passports, drivers licenses, ATM cards, credit and debit cards, banknotes, cheques, security passes, land title deeds, wills, air tickets, certificates, paintings, cut and uncut diamonds and other precious stones.

The invention is further illustrated by reference to the following non-limiting examples and drawings, in which.

Figure 1A:
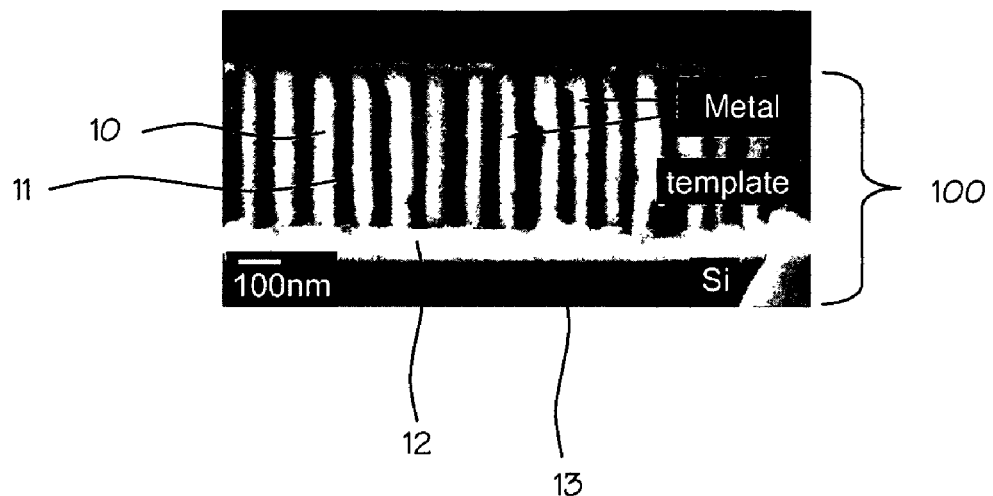
FIG. 1A shows a scanning electron microscope (SEM) image of a cross section of a tag of porous alumina of the present invention on a silicon substrate. The pores of the alumina have been filled with metal via electroplating.
Figure 1B:
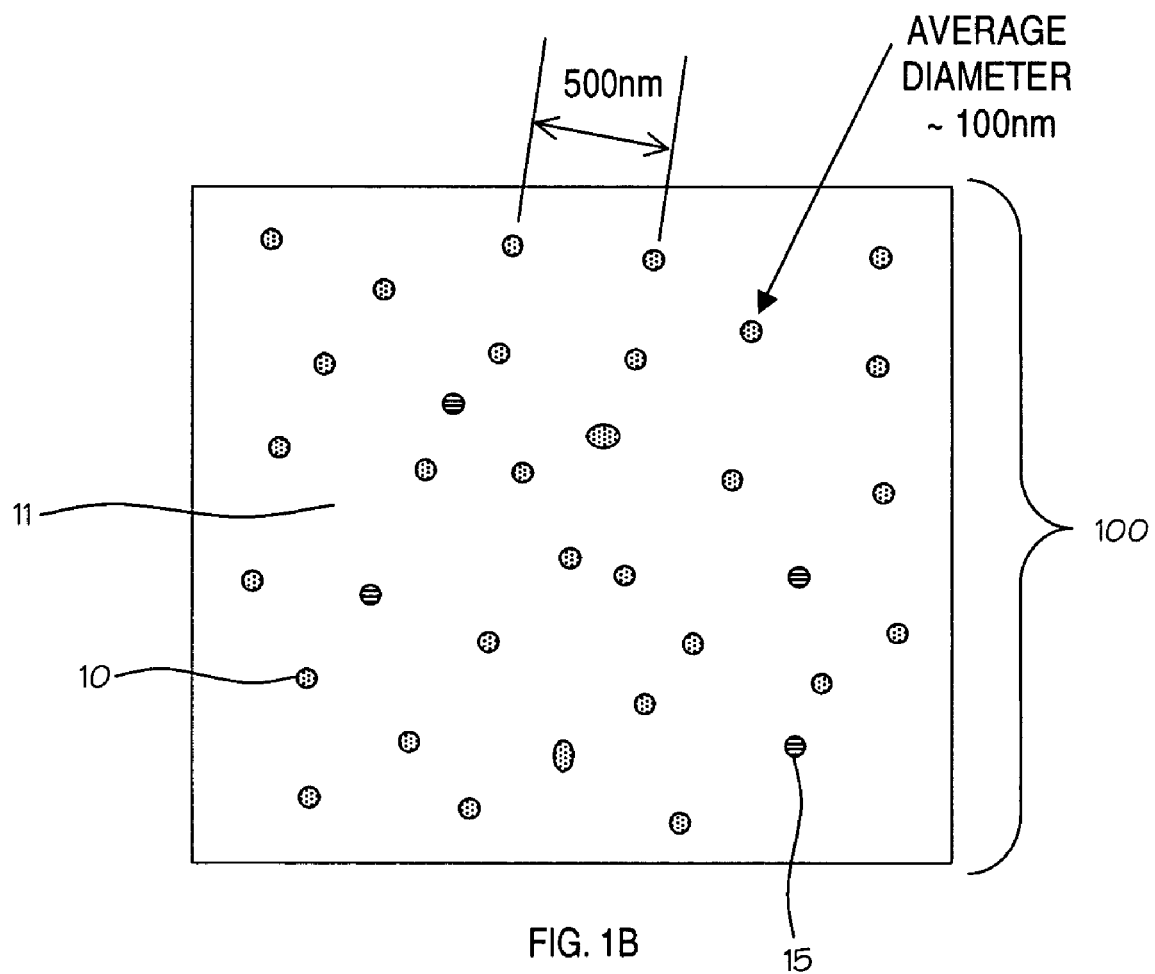
FIG. 1B shows a plan view schematic drawing of a tag of porous alumina of the present invention having some of its pores filled with magnetic material.
Figure 2:
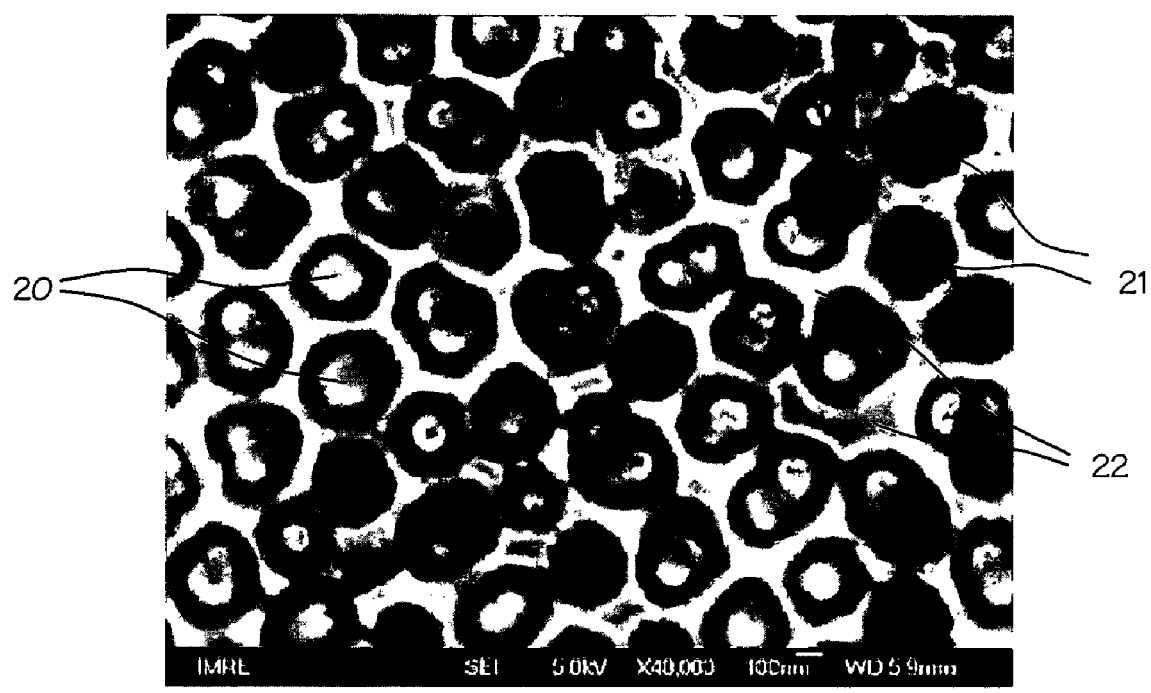

FIG. 2 shows a plan view SEM image of a tag similar to that in FIG. 1 where Ni has been used as the magnetic material for filling the pores. Alumina remains as the template material. Pores that are filled with Ni appear lighter in shade while unfilled pores appear black.

Figure 3A:
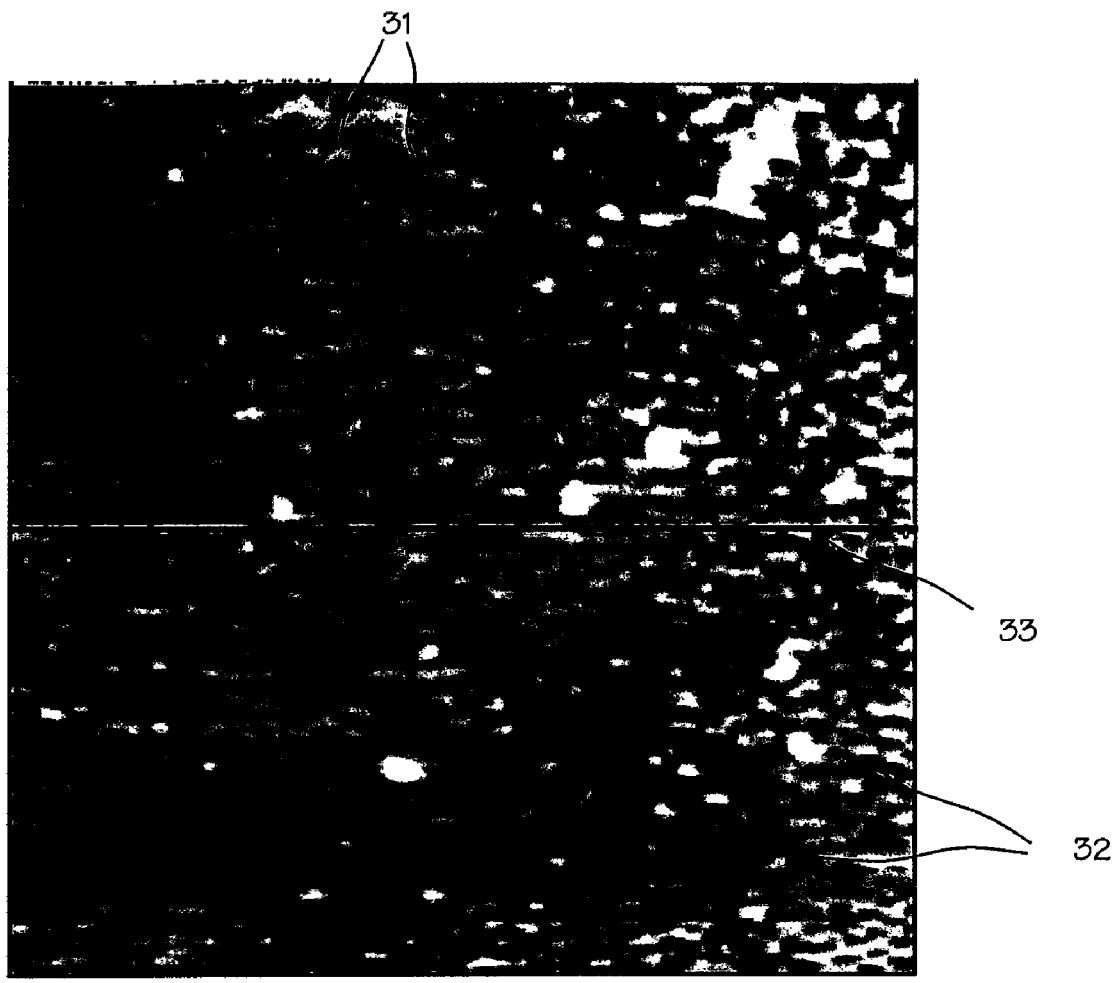
Figure 3B:
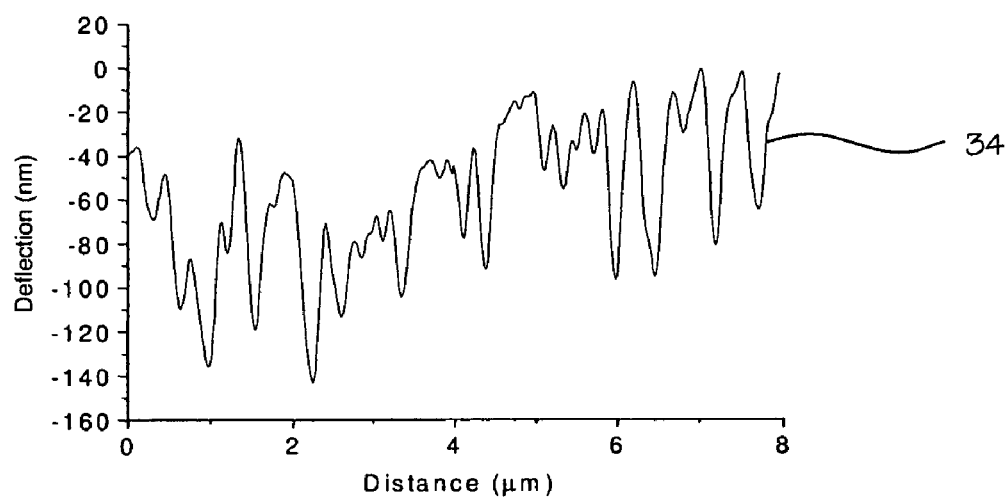

FIG. 3A shows a magnetic force microscope (MFM) image of a nano-magnet array embedded in alumina host material, and FIG. 3B shows a corresponding line scan image indicating magnetically derived deflection signals obtained along the scanned path shown as a black line in FIG. 3A.

Figure 4:
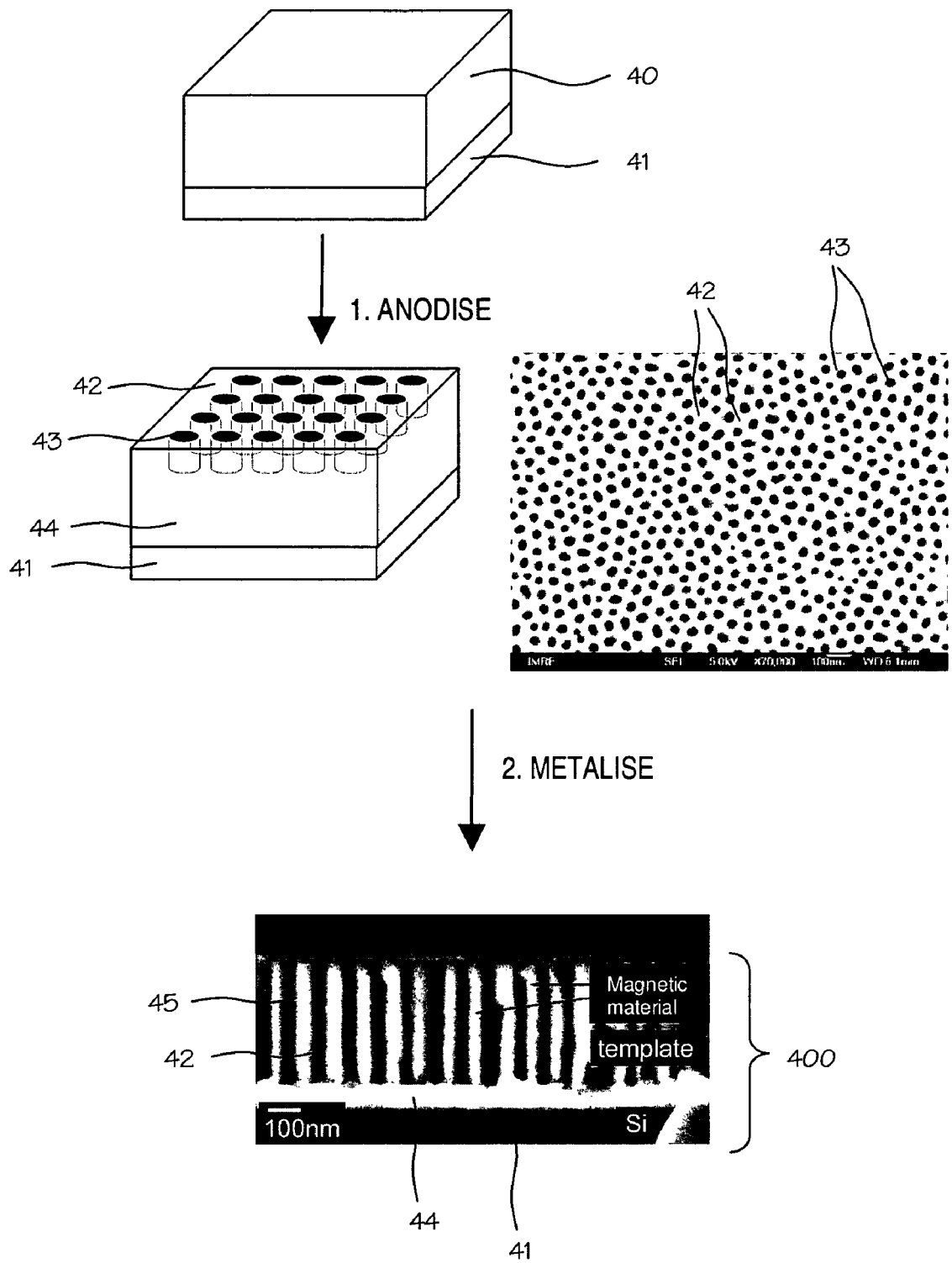

FIG. 4 shows a flow diagram of a method for manufacturing a tag for use in the present invention.

Figure 5:
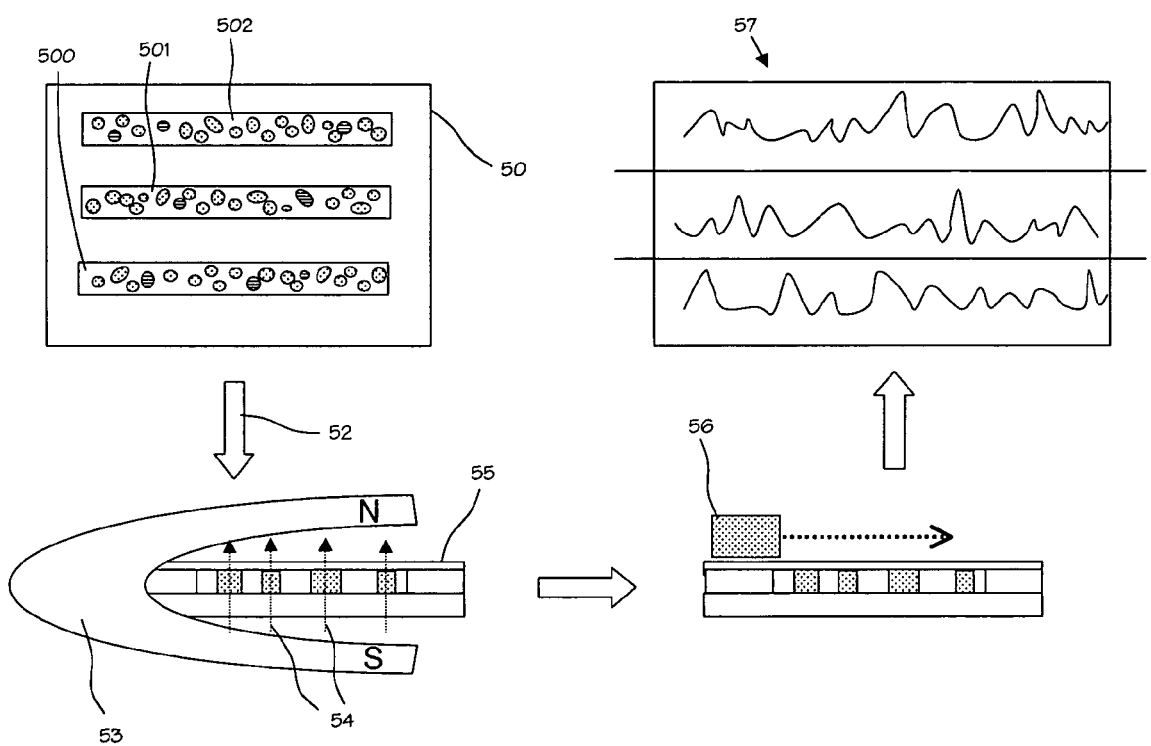

FIG. 5 shows a flow diagram of a method of using porous alumina to tag an object.

Figure 6A:
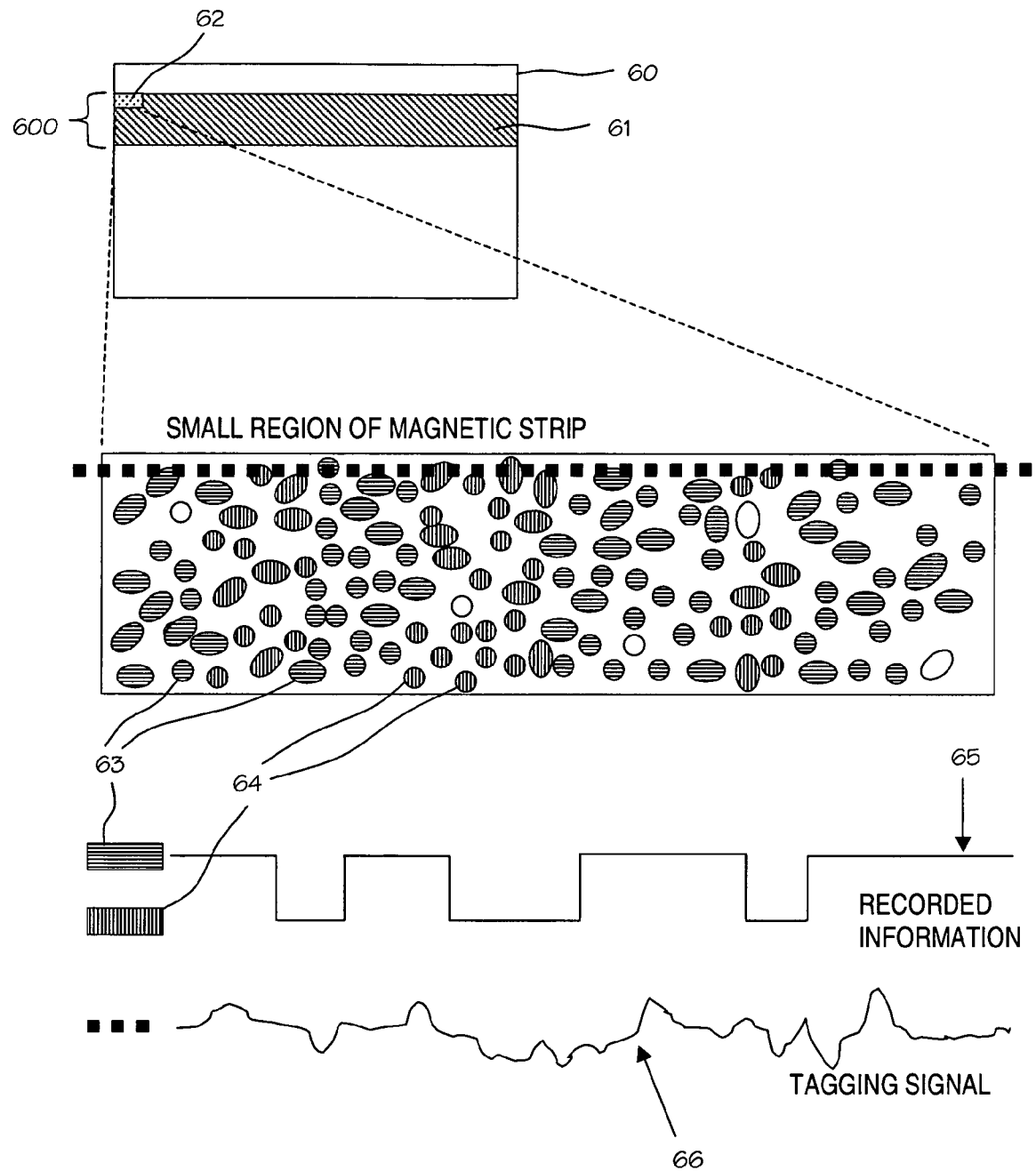
Figure 6B:
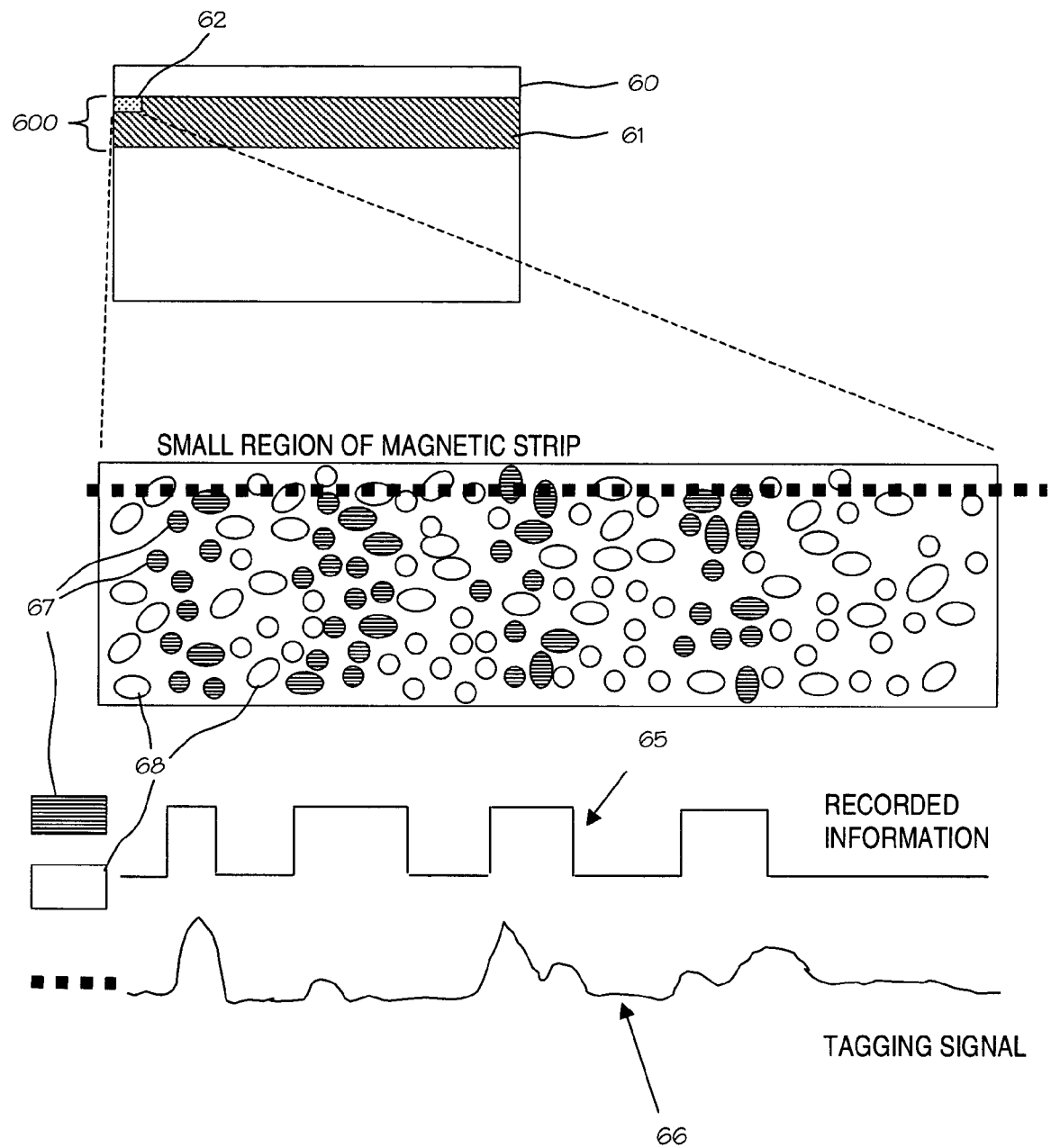
Figure 6C:
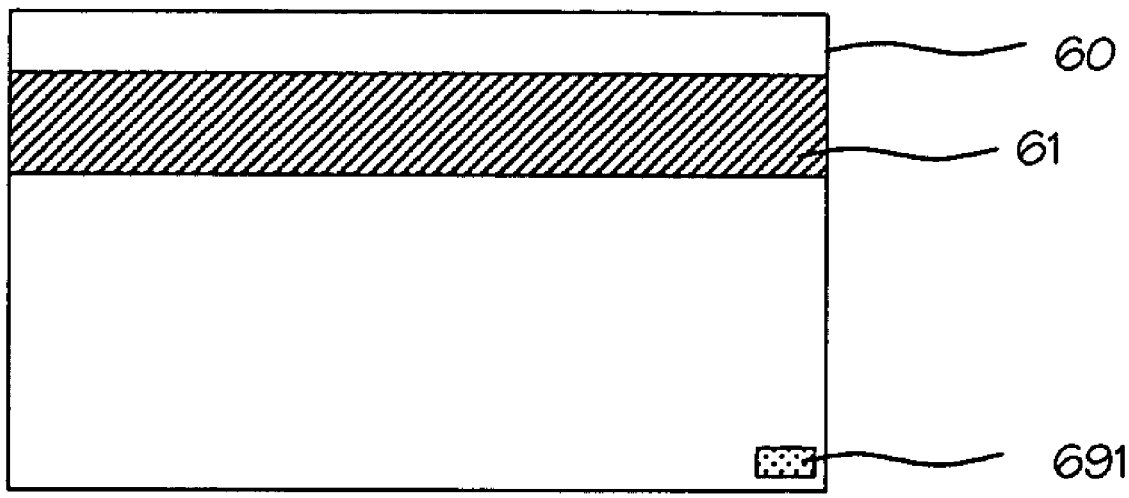
Figure 6D:
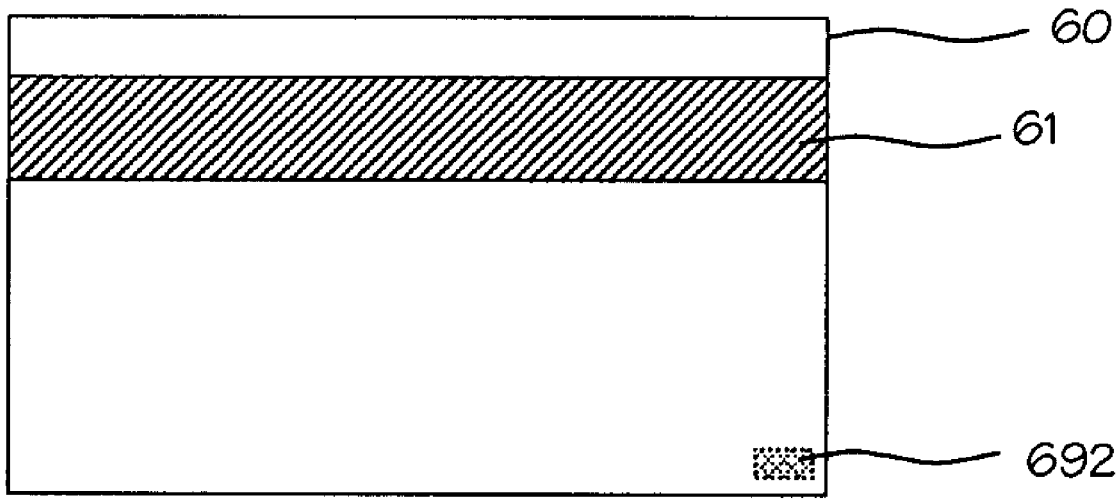

FIGS. 6A and 6B show embodiments of the invention, in which the tag is arranged as part of a magnetic strip on a plastic card (e.g. credit or ATM card). This allows the tag to store both recorded information as well as identification information. FIGS. 6C and 6D illustrate embodiments of the invention in which the tag is separately arranged from the recorded information.

FIGS. 7A to 7E show possible patterns each of which can be used as a reference marking for guiding a read head to a tag.

Figure 8:
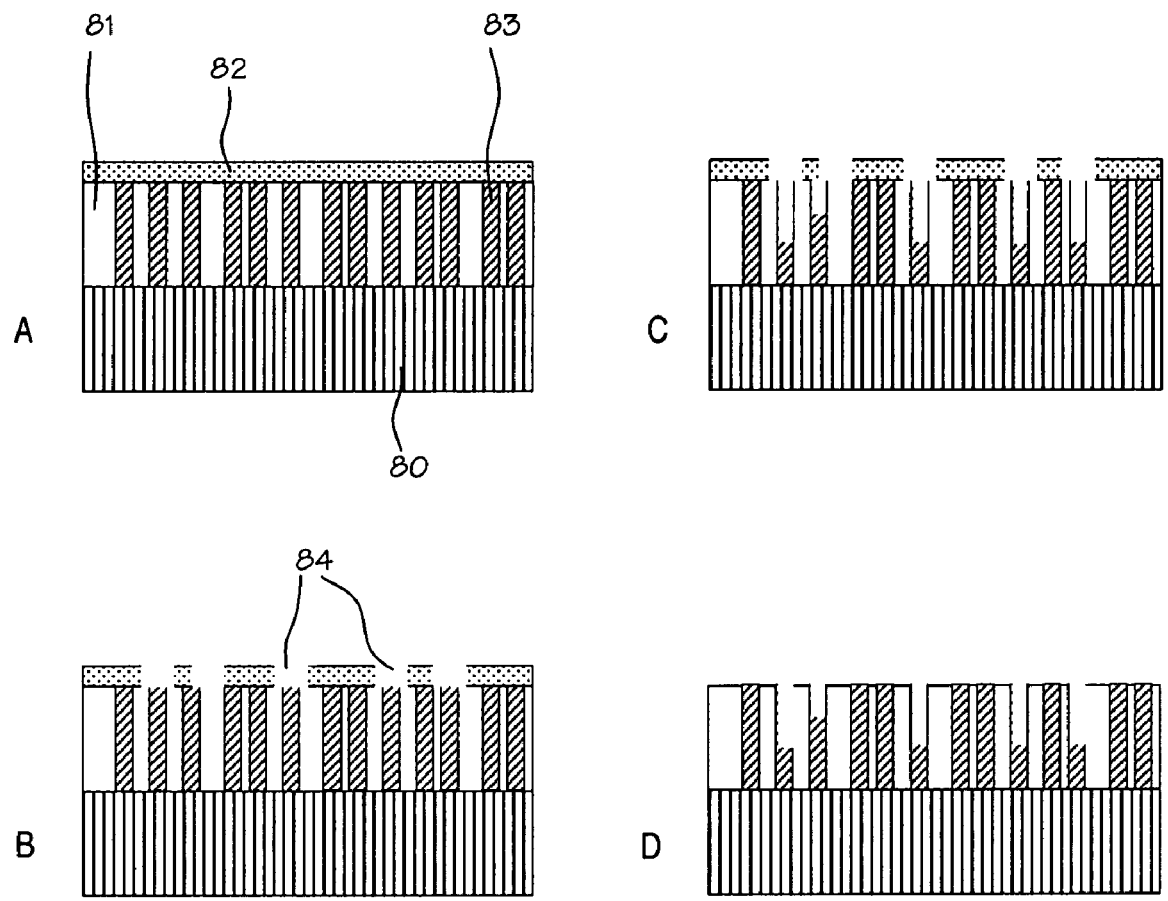

FIG. 8 shows the steps involved in one method for carrying out the selective etching of magnetic material in a tag in order to vary the degree of pore filling in a tag.

Figure 9:
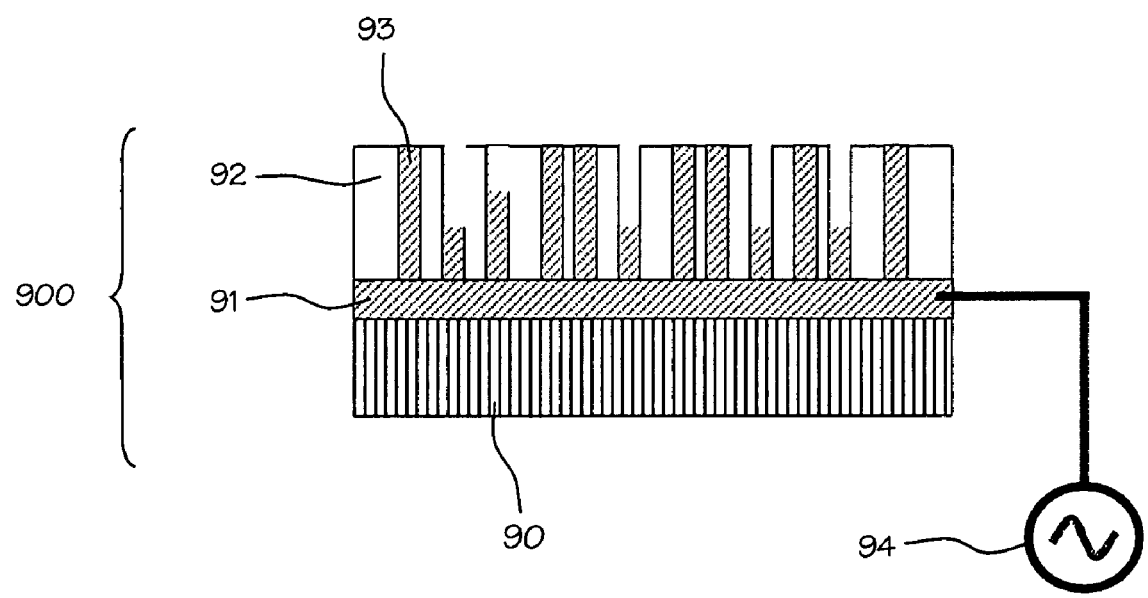

FIG. 9 shows a schematic of the cross section of a tag which comprises an electrically insulating porous host material filled with tin. A voltage source is coupled to the tin so that an electromagnetic field is obtained from the tag.

In the context of this specification, the terms "individually tagging", "fingerprinting" and "identifying" and their derivatives are used interchangeably to mean marking an item in such a way that it can be distinguished uniquely from other items. Although "watermarking" and "barcoding" are sometimes used in this context, these terms generally refer to distinguishing a group of items from another group of items, e.g. a banknote watermark distinguishes it from a fake note, but it does not distinguish a banknote from other individual genuine banknotes.

EXAMPLE 1

Method of Identifying an Object Having Identification Information in which the Identity Tag is Mounted on a Substrate FIG. 1A and FIG. 1B show respectively the cross section and plan view of a tag 100 that can be utilized in the inventive method of the present application.

The electrochemically deposited magnetic material 10 appears as columns having a lighter shade, while the surrounding host material 11 appears in a darker shade. A conductive metal layer 12 lies perpendicular to the columns. This layer facilitates electrodeposition or pulsed electrodeposition of the columns, it may also facilitate adhesion between the host material and underlying substrate. Metal layer 12 may be formed from a metal such as titanium or it may be formed from aluminium that has not been anodized. A silicon substrate 13 supports the porous composite. As shown in FIG. 1B, the distance between pores of a tag 100 is at about 500 nm, with average pore diameters at about 100 nm. Unfilled pores 15 appear more darkly shaded than pores having magnetic material.

In FIG. 2, it can also be seen that occupied pores 20 appear in a lighter shade than empty pores 21. Each pore is separated from other pores by the surrounding host material 22. FIG. 3 shows a magnetic force microscopy (MFM) image of the surface of a porous host material which has its pores substantially filled with electrodeposited nickel, a ferromagnetic material. The darker regions 32 correspond to regions on the host in which the pores are filled with magnetic material, while the regions 31 correspond to regions in which are substantially magnetically inert. A line scan that is performed along the black line 33 produces the graphical signal 34 shown in FIG. 3B. This signal represents a measurement of a characteristic of the magnetic field of the tag along the line 33. It shows the amount of deflection of the probing tip of the magnetic force microscope when moved across the line 33.

FIG. 4 shows a scheme of a two step method for making a tag 400 as follows. A free-standing aluminium film 40 measuring approximately 1 cm×1 cm is obtained. Adhesive-backed aluminium tape (99% pure) was purchased from Tesa Tape Inc. The tape is adhered to a corresponding silicon substrate 41 and held in a 0.2M sulphuric acid bath. The anode of a galvanostat is electrically attached to the aluminium foil, while the cathode is connected to a platinum electrode held in the bath. A DC voltage of 25V is applied for 2 hours. Disordered pores 43 develop all over the surface of the host material 42, 44.

Once a porous alumina host is obtained, pulsed electrodeposition is employed to deposit a magnetic material (e.g. iron, nickel or cobalt) into the pores. An alternating current is imposed between the anodic alumina and the cathode. Since anodic alumina conducts preferentially in only one direction (cathodic direction), metal ions are reduced inside the pores during the cathodic half-cycles without re-oxidising in the anodic half-cycles. The deposited magnetic material appears as vertical columns 45 occupying the pores.

After deposition of the magnetic material into the desired pores, the surface of the tag is smoothed using conventional polishing techniques such as lapping or chemical mechanical polishing. (known as CMP).

Finally, the tag is coated with a thin layer of diamond-like carbon and a layer of polyethylene protective film is spun cast over the diamond-like carbon layer.

Referring now to FIG. 5, a simplified scheme showing a method of obtaining a fingerprint is described. Firstly, a strip of aluminium Tesa tape measuring 8 cm×1.5 cm is anodized and subsequently electrodeposited with magnetic material according to the method described above. The processed strip is then mechanically sliced into 3 smaller and similarly sized strips and attached onto the top of an object 50 to be tagged. These strips now form 3 independent tags 500, 501 and 502.

Prior to reading, the tags 500, 501 and 502 are coated with a protective coating 55 and then magnetized (the magnetization process is symbolized by the arrow 52) by subjecting the tags to a uniform magnetic field 54 perpendicular to the plane of the tags. The magnetic field is provided for in the reader device in which a write head is installed. Then, the object is moved across beneath a read head 56. Alternatively, the read head is moved across the surface of the tags. The read head picks up magnetic field signals 57 corresponding to the characteristic of the magnetic field measured across the tags, and then stores the data representing these signals 57. The stored data forms the first identification information of the object.

When the object is subsequently subject to a verification procedure, the same steps mentioned above are repeated. The tags are first magnetized and then read by the reader. Data obtained from the reading represents a second magnetic signal. This data is subsequently fed to a computer unit, which retrieves the data corresponding to the previously stored identification information. The computer compares both sets of data and computes the degree of fit between the them. If the match is above a tuneable tolerance level, the computer returns an authentication response indicating successful authentication.

EXAMPLE 2

Method of Identifying an Object Having Identification Information in which the Identity Tag is Directly Deposited onto the Object The invention can also be implemented by preparing a porous tag in-situ on an object itself. The object on which a tag or a series of tags is created in-situ can be similar to the tagged object 50 in FIG. 5.

An electrically conductive adhesion layer, such as titanium or chromium, is deposited first—this facilitates adhesion and electrodeposition of the magnetic material into the pores. Aluminium is deposited via physical vapour deposition (also known as sputtering) onto a small surface of the object to be tagged.

After the deposition of aluminium, the aluminium is subjected to an anodisation process in order to create the desired pores, thereby forming porous alumina. This porous alumina forms the host material of the tag.

Thereafter, the porous alumina is subjected to pulsed electrodeposition as mentioned above to deposit magnetic material, e.g. iron, into the pores.

Thereafter the surface is polished by known methods, such as lapping or CMP.

The surface is further coated with a protective layer of amorphous carbon and then, if necessary, a polyethylene layer, as described above to form a tag.

A reader incorporating a read and write head is used to first magnetise the tag and then subsequently read the resulting magnetic signal from the tag, thereby obtaining the identification information of the object that is tagged.

Subsequently, when carrying out the verification step, the tag is subject to an optional remagnetization step followed by reading in order to obtain a second specific magnetic signal from the tag. The data corresponding to the signal are fed to a computer, where they are compared with the stored identification information and authenticated accordingly.

EXAMPLE 3

A Method of Patterning a Tag for Storing Recorded Information and Tagging Information on a Tag FIG. 6A to FIG. 6D show embodiments of a tag 600 which is used to store recorded information and tagging information.

In the embodiment shown in FIG. 6A, the tag 600 that forms a magnetic strip 61 is comprised of porous host material in which the majority of pores are filled with magnetic material. Recorded information (e.g. personal particulars, data related to the object that is tagged, or any dynamic data) is stored by magnetising the magnetic material in the pores into groups/domains 63, 64 each having a specific individual magnetic orientation.

A strip of aluminium measuring 8 cm×1.5 cm is anodised and has its pores electrodeposited with iron-nickel alloy according to Example 1. The processed strip 61 is then attached to a plastic card 60. Information that is to be written on the strip is translated by a suitable computer program into a corresponding digital signal 65. Magnetic material in the pores is magnetised into groups (domains) 63 and 64, wherein each group is orientated in a specific direction according to the digital signal 65. For this purpose, Neuron Electronics Inc.'s low-coercivity magnetic swipe card encoder/reader MCR230N is used. A 1 cm×0.5 cm region 62 at one end of the strip is designated for producing/obtaining the unique tagging signal. Location marks described later may usefully be incorporated in this embodiment. This region is magnified in FIG. 6A to show the arrangement of magnetic material on the strip. When reading the tagging information from the designated portion of the strip, a high resolution read head is used to read an analogue signal 66 of the linear magnetic field strength above the tag. http:///

In another embodiment of the tag, recorded information is stored on the strip 61 by patterning groups of pores in the host material with magnetic material according to a predetermined pattern. In this embodiment, the medium storing the recorded and tagging information is comprised of a strip of porous host material in which intermittent groups of pores are filled with magnetic material. As shown in FIG. 6B, some groups of pores 67 are filled with magnetic material (shaded grey in the figure) while other groups of pores 68 are left empty (unshaded). The groups of filled pores are patterned to correspond to a desired digital signal 65 which is produced when reading the strip. This digital signal should in turn correspond to the static data or fixed label that is to be recorded onto the strip. For this purpose, a computer program can be used to assign each number and each letter of the alphabet to a specific digital signal pattern, thereby enabling the translation of human readable information to/from magnetic storage patterns. In order to fill the pores of the strip according to such a pattern, a lithographic process is used. First, the surface of the porous host material is capped with a masking layer prior to the deposition of magnetic material. This is achieved, for example, by evaporating an aluminium transfer layer onto the surface of the porous strip. A layer of positive resist (AR-U4040, Allresist GmbH) is applied, by spin coating for example, onto the Al transfer layer, and patterned accordingly by conventional photo-lithography. A wet chemical etch is subsequently performed using phosphoric acid and nitric acid and a small amount of wetting agent across the surface of the strip. The Al transfer layer not covered by the resist can be completely removed after 30 min of etching. After etching, there remains on the strip an Al transfer layer that is patterned with exposed regions. Finally, these exposed regions are then filled with magnetic material by electrodeposition. For reading the recorded information on the strip, the MCR230N swipe reader from Neuron Electronics Inc. is used. As for the tagging signal, a 1 cm×0.5 cm region 62 at one end of the strip is designated and read by the above mentioned higher resolution read head to obtain the tagging signal.

In a further embodiment of the invention, the tag does not reside on the same strip (which is made out of alumina as described in Example 1) containing the recorded information, but is located at another suitable position on the card. FIG. 6C shows a card having a tag region 691 located separately at the lower right hand corner of the card. This layout can be suitable for having the high resolution read head (for reading the tagging information) and magnetic swipe card read head (for reading the recorded information) mounted on a single actuator. When carrying out a reading of both the strip and tag, the actuator first positions the magnetic swipe card read head across the strip and then moves it across the strip. Subsequently, the actuator moves the analogue signal read head over the tag to obtain the tagging information. The reading is thus done consecutively. FIG. 6D shows a card having a tag region 692 located on the opposite side of the card. This layout can be suitable when it is desired to mount the two read heads on separate actuators. Each actuator can be located on opposite sides of the card and can move simultaneously and independently of each other, thus achieving a faster reading. The recorded information can also be read by a static magnetic swipe card read head and the action of an arm moving the card past the detector in the conventional manner.

EXAMPLE 4

A Method of Patterning a Reference Marking to Guide a Read Head in Locating a Tag FIGS. 7A to 7E show embodiments of different reference markings which can be separate from the tag or form part of the tag and be used for relocating the information on a tag. Reference markings are used if it is desired to increase the speed of locating the information on a tag on an object. As the size of tags can range from a few micrometers to several centimeters, a number of schemes can be used to direct the read heads towards the information on the tag.

Figure 7A:
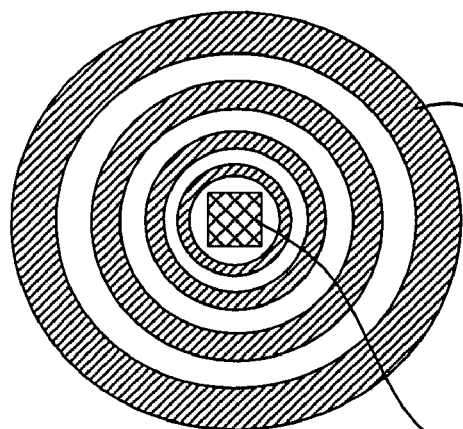
Figure 7B:
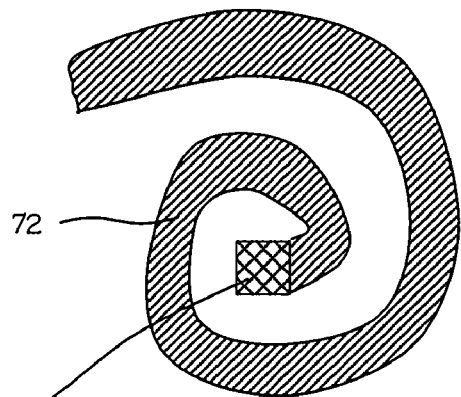
Figure 7C:
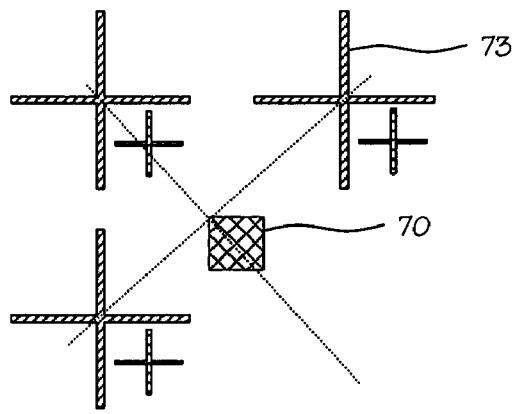
Figure 7D:
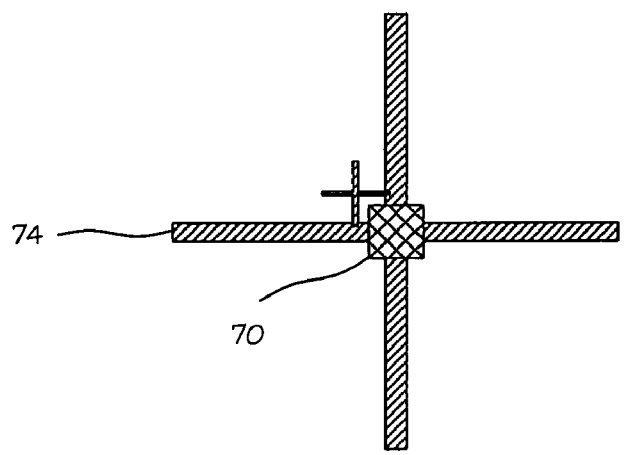
Figure 7E:
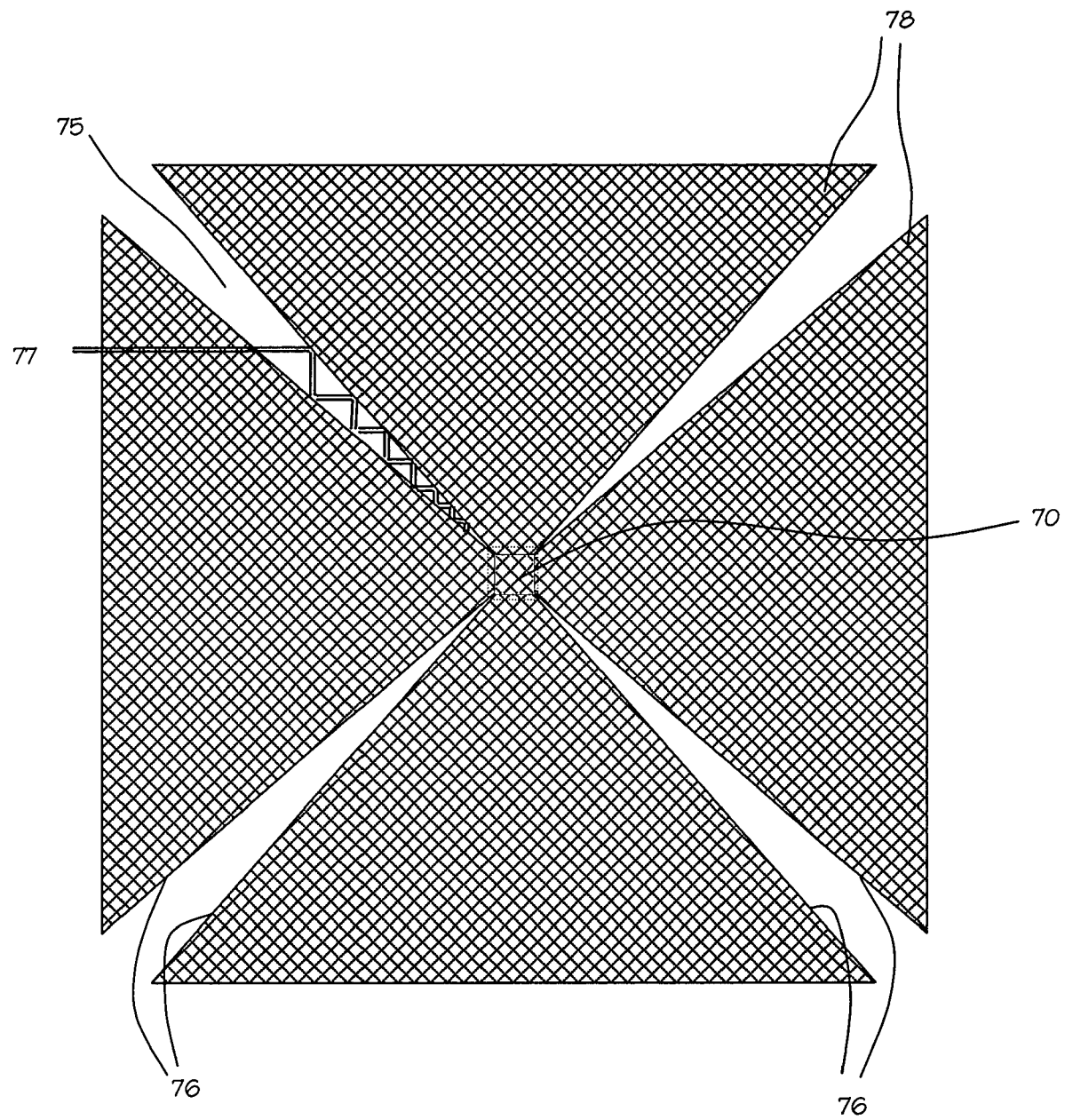

The differently shaped reference markings in each of the five embodiments shown in FIGS. 7A to 7E can be detected for example by magnetic, optical or textural means. These shapes are designed to guide the read head to the information on the tag, shown as a square-shaped hatched region in each case. In general, the reference markings are etched into a desired pattern using methods described previously, e.g. so that of magnetic material fills the pores in regions to form the desired pattern. This pattern forms the guide to the information on the tag 70 on a common substrate e.g. a plastic card. FIG. 7A shows a series of concentric rings 71 which target the information on the tag 70 at the centre. These rings may span much larger areas than the information on the tag. The narrowing ring annuli helps to ensure that the information on the tag 70 is found. In FIG. 7B, the spiral-shaped reference marking 72 guides a read head to move in an inward-spiral towards the information on the tag 70. In FIG. 7C, fiducial marks 73 allow the position of the information on the tag 70 to be calculated through triangulation (dotted lines) of the crosshair centres. In FIG. 7D, a crosshair arrangement of fiducial marks 74 indicates the location of the information on the tag 70. In each case, the control system for moving the read head could be programmed to follow the specific location and movement rules appropriate for each marking system used. FIG. 7E shows a further embodiment of a reference marking in which a V-shaped non-magnetic region 75 is patterned and used to direct the read head to the information on the tag 70.

The reference marking of FIG. 7E can be made and used in the invention as follows. A 1 cm×1 cm square-shaped die is cut out of adhesive-backed copper tape is sputter coated with a one micrometer thick layer of aluminium. The wafer is then anodized to make the aluminium porous. Resist is spun coated onto the wafer and patterned using conventional photolithography leaving four V-shaped regions of photoresist 75, each of which touches the four corners of the region designated to hold the information of the tag 70 at the centre. The entire cut wafer is then electrodeposited with magnetic material according to the procedures described in Example 1, the resist is removed, and then finally attached to an object to be tagged.

In this embodiment, a read head can be designed to move according to a set of rules as explained in the following. First, the read head is made to move along a path 77. Once it detects a non-magnetic region 75, the read head switches to a programmed rule of detecting the boundary between the non-magnetic region 75 and the surrounding magnetic region 78. Whenever a boundary is detected, the read head rebounds (deflects) at 90° (or any other suitable angle) away from its original line of motion. The distance travelled by the read head after each deflection becomes progressively shorter than the previous as the read head moves towards the tip of the V-shaped region. In this way, the read head is channelled towards the tag after several deflections. When the read head finally reaches the tip of the V-shaped region, the read head is positioned at the desired starting position for reading the tag.

EXAMPLE 5

A Method of Varying the Degree of Pore Filling in a Tag

FIGS. 8A to 8D show a portion of a tag in which the process of varying the degree of pore filling in the tag is carried out. The following steps of varying the pore filling in the tag is based on photolithographic procedures.

A 1.5 micrometer layer of aluminium is evaporated onto a 1 cm×1 cm silicon wafer substrate 80 and processed into a tag comprising a host material 81 filled with a magnetic material 83 as explained in Example 1. Here nickel is used as the magnetic material. A layer of photoresist 82 is spincoated onto the surface of the tag. The photoresist is AR-U4040 from Allresist GmbH. FIG. 8A shows the cross-section of a tag prepared in this manner. The photoresist is patterned according to a predetermined pattern using standard photolithography techniques available from the manufacturer or any text on silicon processing. After photolithographic pattern the photoresist mask contains a pattern of holes 84 (see FIG. 8B). If it is desired, the tag can be further subjected to hard baking to harden the remaining photoresist on the tag to protect the portions of the tag covered by the photoresist from the etching agent. Subsequently an etching solution is used to remove nickel from pores that are not protected by the photoresist mask. In the case where nickel is the magnetic material the etching solution can be made by mixing the following chemicals: 5 parts $HNO_3$, 5 parts $CH_3COOH$, 2 parts $H_2SO_4$, 28 parts $H_2O$. After etching the tag is washed with distilled water. The tag now has the structure shown in FIG. 8C. Finally, acetone is used to remove remaining photoresist (see FIG. 8D).

Instead of patterning the mask according to a predetermined pattern, it is also possible to randomize the locations of the openings. One method for achieving randomized openings is to bombard a polymer masking layer with high energy ions as described by Bernhardt et al., J. Vac. Sci. Technol. B, 18, 1212-1215 (2000).

In order to increase the disorder in the tag, it is not necessary to remove all the magnetic material from a pore. It is usually sufficient that only a portion of the material is removed in order to significantly reduce its magnetic signal at the surface of the host material.

Other schemes to increase disorder by selectively filled pores are contemplated. For example, the electrically conducting layer below the host material could be patterned into conducting and insulating regions prior to electrodeposition. This would cause some of the holes to remain unfilled or to be only partially filled with magnetic material.

EXAMPLE 6

A Method of Identifying an Object Having Identification Information Using a Tag which Comprises Electrically Conducting Material to Produce Electromagnetic Fields FIG. 9 shows the cross section of a tag 900 in which an electrically conductive layer 91 below the filled pores is connected to a voltage source 94. The electrically conductive layer is in electrical contact with at least some of the material filling the pores. Such a tag is made and used to tag an object in the following manner. A strip of porous alumina host material 92 is prepared and then mounted on a substrate 90. The pores of the host material are electrodeposited with tin 93. Next, the conductive layer 91 is electrically coupled to an AC voltage 94 to induce magnetic fields around the material within the pores. The induced magnetic fields could be measured using methods described above. These induced electromagnetic fields then become the unique tagging signal used to uniquely identify the tag.

The above method does not only work with a fluctuating AC voltage. A uniform (static or pedistal) voltage, alternating voltage and a combination of the two can also be used to produce electric fields around the material within the pores. The electric fields could be measured by, for example, static capacitance measurements. These electric fields then become the characteristic used to uniquely identify the object on which the tag is attached.

As seen from the above, the material within the pores of the tags that are used in the above two methods need not necessarily be substantially magnetic, as shown for the tag described in Example 1. It is sufficient that the material is electrically conductive in order for the tag to be used in the above method. The host material should, however, be substantially electrically insulating.

What is claimed is:

1. A method of identifying an object having identification information, and wherein said identification information is used to verify the identity of the object, said method comprising:
    (a) determining at least one characteristic of a magnetic field of at least a portion of a tag, thereby obtaining a first specific magnetic signal, wherein the tag comprises (i) a host material inherently having a disordered plurality of pores on a surface thereof, said pores having a size of at least 10 nm, said host material being at least substantially non-magnetic, and (ii) a magnetic material positioned within at least some of the inherently existing disordered plurality of pores, wherein the specific magnetic signal providing identification information for the object represents the disorder of the plurality of pores, and
    (b) storing signal information relating to said first specific magnetic signal, said stored signal information forming the identification information of the object.

2. The method of claim 1, wherein the step of determining at least one characteristic of said magnetic field of the at least one portion of said tag comprises a measurement of said characteristic of the site specific magnetic field over a surface of said portion of the tag, thereby mapping a magnetic fluctuation signal.

3. The method of claim 1, wherein storing signal information relating to the first specific magnetic signal comprises storing data corresponding to the at least one characteristic of said magnetic field over said portion of the tag.

4. The method of claim 1, further comprising:
subsequently determining the at least one characteristic of the magnetic field of said portion of the tag, thereby obtaining a second specific magnetic signal, and comparing said second specific magnetic signal with the previously stored identification information.

5. The method of claim 4, further comprising:
magnetizing the tag prior to each determination of the at least one characteristic of the magnetic field of said portion of the tag.

6. The method of claim 1, further comprising:
recording information on the tag by magnetizing the magnetic material present in groups of pores into poled domains, or patterning pores of the tag with magnetic material.

7. The method of claim 1, wherein the tag is attached to the object to be identified after obtaining the first specific magnetic signal.

8. The method of claim 1, wherein the tag is attached to the object to be identified before obtaining the first specific magnetic signal.

9. The method of claim 1, wherein the tag comprises a substrate supporting the host material.

10. The method of claim 9, wherein the substrate comprises material selected from the group consisting of metal, silicon, silica, glass, plastic, ceramic and combinations thereof.

11. The method of claim 1, wherein the host material is selected from the group consisting of alumina, zeolites, group III-V materials, polymers, silicon oxide, zinc oxide and tin oxide.

12. The method of claim 1, wherein the host material comprises nanotubes.

13. The method of claim 12, wherein the nanotubes are cast within a second host material.

14. The method of claim 1, wherein the magnetic material is selected from the group consisting of Fe, Ni, Co, their alloys, oxides, mixtures and combinations thereof.

15. The method of claim 1, wherein the pores of the host material have a diameter between 100 nm to 500 nm.

16. The method of claim 1, wherein the tag further comprises at least one coating layer.

17. The method of claim 1, wherein said at least one characteristic of the magnetic field of the portion of the tag is highly dependent on the disorder of the tag.

18. The method of claim 17, wherein the disorder is due to a feature selected from the group consisting of pore size, shape and orientation of pores, percentage of pore filling, crystal orientation of magnetic material in the tag, and combinations thereof.

19. A method of producing a system for object identification, said method comprising:
(a) determining at least one characteristic of the magnetic field of at least a portion of a tag, thereby obtaining a first specific magnetic signal, wherein the tag comprises (i) a host material inherently having a disordered plurality of pores on a surface thereof, said pores having a size of at least 10 nm, said host material being at least substantially non-magnetic, and (ii) a magnetic material positioned within at least some of the inherently existing disordered plurality of pores, wherein the specific magnetic signal providing identification information for the object represents the disorder of the plurality of pores, and
(b) storing signal information relating to said first specific magnetic signal, said stored signal information forming the identification information of an object to be identified.

20. A tag carrying identification information, said identification information is used to verify an object's identity, said tag comprising:
(a) a host material inherently having a disordered plurality of pores on a surface thereof, said pores having a size of at least 10 nm, said host material being at least substantially non-magnetic,
(b) a magnetic material positioned within at least some of the inherently existing disordered plurality of pores, wherein the identification information for the object is a magnetic signal representing the disorder of the plurality of pores, and
(c) at least one coating layer covering at least partially a surface of the host material.

21. The tag of claim 20, wherein said coating layer comprises a material which has a bulk yield stress greater than 50 $MN/m_2$.

22. An object having a tag carrying identification information, said identification information is used to verify the object's identity, said tag comprising:
(a) a host material inherently having a disordered plurality of pores on a surface thereof, said pores having a size of at least 10 nm, said host material being at least substantially non-magnetic,
(b) a magnetic material positioned within at least some of the inherently existing disordered plurality of pores, wherein the identification information for the object is a magnetic signal representing the disorder of the plurality of pores, and
(c) at least one coating layer covering at least partially a surface of the host material.

23. A system for object identification, said system comprising:
(a) a tag carrying identification information, said identification information is used to verify an object's identity, wherein said tag comprises (i) a host material inherently having a disordered plurality of pores on a surface thereof, said pores having a size of at least 10 nm, said host material being at least substantially non magnetic, and (ii) a magnetic material positioned within at least some of the inherently existing disordered plurality of pores, wherein the identification information for the object is a magnetic signal representing the disorder of the plurality of pores, and
(b) a data storage medium for storing data corresponding to a magnetic signal obtained from at least a portion of the tag.

* * * * *